US012094195B2

(12) United States Patent
Komoroski

(10) Patent No.: US 12,094,195 B2
(45) Date of Patent: Sep. 17, 2024

(54) IDENTIFYING STAIRS FROM FOOTFALLS

(71) Applicant: Boston Dynamics, Inc., Waltham, MA (US)

(72) Inventor: Adam Komoroski, Waltham, MA (US)

(73) Assignee: Boston Dynamics, Inc., Waltham, MA (US)

(*) Notice: Subject to any disclaimer, the term of this patent is extended or adjusted under 35 U.S.C. 154(b) by 660 days.

(21) Appl. No.: 16/877,680

(22) Filed: May 19, 2020

(65) Prior Publication Data
US 2021/0323618 A1 Oct. 21, 2021

Related U.S. Application Data

(60) Provisional application No. 63/012,614, filed on Apr. 20, 2020.

(51) Int. Cl.
G06V 20/10 (2022.01)
B62D 57/024 (2006.01)
(Continued)

(52) U.S. Cl.
CPC ........... G06V 20/10 (2022.01); B62D 57/024 (2013.01); B62D 57/032 (2013.01); G06F 18/23 (2023.01); G06V 10/44 (2022.01); G06V 10/762 (2022.01)

(58) Field of Classification Search
CPC .. B62D 57/024; B62D 57/032; G06V 10/762; G06V 10/44; G06V 20/10; G06F 18/23
See application file for complete search history.

(56) References Cited

U.S. PATENT DOCUMENTS 3,533,483 A 10/1970 Ballinger
5,378,969 A 1/1995 Haikawa
(Continued)

FOREIGN PATENT DOCUMENTS

CN 103273984 9/2013
CN 103273985 9/2013
(Continued)

OTHER PUBLICATIONS

C. Fu and K. Chen, "Gait Synthesis and Sensory Control of Stair Climbing for a Humanoid Robot," in IEEE Transactions on Industrial Electronics, May 2008, pp. 2111-2120 vol. 55, No. 5, doi: 10.1109/TIE.2008.921205. (Year: 2008).
(Continued)

Primary Examiner — Joan T Goodbody
(74) Attorney, Agent, or Firm — Knobbe, Martens, Olson & Bear, LLP

(57) ABSTRACT

A method of identifying stairs from footfalls includes receiving a plurality of footfall locations of a robot traversing an environment. Each respective footfall location indicates a location where a leg of the robot contacted a support surface. The method also includes determining a plurality of candidate footfall location pairs based on the plurality of footfall locations. The candidate footfall location pair includes a first and a second candidate footfall location. The method further includes clustering the first candidate footfall location into a first cluster group based on a height of the first candidate footfall location and clustering the second candidate footfall location into a second cluster group based on a height of the second candidate footfall location. The method additionally includes generating a stair model by representing each of the cluster groups as a corresponding stair and delineating each stair based on a respective midpoint between each adjacent cluster group.

24 Claims, 8 Drawing Sheets

(51) Int. Cl.
*B62D 57/032* (2006.01)
*G06F 18/23* (2023.01)
*G06V 10/44* (2022.01)
*G06V 10/762* (2022.01)

(56) References Cited

U.S. PATENT DOCUMENTS

| | | |
|---|---|---|
| 5,402,050 A | 3/1995 | Ozawa |
| 5,416,393 A | 5/1995 | Gomi et al. |
| 5,737,217 A | 4/1998 | Nishikawa et al. |
| 5,838,130 A | 11/1998 | Ozawa |
| 5,872,893 A | 2/1999 | Takenaka et al. |
| 5,974,366 A | 10/1999 | Kawai et al. |
| 6,021,363 A | 2/2000 | Nishikawa et al. |
| 6,177,776 B1 | 1/2001 | Kawai et al. |
| 6,317,652 B1 | 11/2001 | Osada |
| 6,438,454 B1 | 8/2002 | Kuroki |
| 6,527,071 B1 | 3/2003 | Villedieu |
| 6,718,231 B2 | 4/2004 | Konno et al. |
| 7,053,577 B2 | 5/2006 | Nagasaka |
| 7,127,326 B2 | 10/2006 | Lewis |
| 7,219,064 B2 | 5/2007 | Nakakita et al. |
| 7,319,918 B2 | 1/2008 | Takenaka et al. |
| 7,482,775 B2 | 1/2009 | Zaier |
| 7,653,216 B2 | 1/2010 | Kanade et al. |
| 7,878,276 B2 | 2/2011 | Limbacher |
| 7,912,583 B2 | 3/2011 | Gutmann et al. |
| 8,289,321 B2 | 10/2012 | Gutmann et al. |
| 8,410,732 B2 | 4/2013 | Kassow et al. |
| 8,457,830 B2 | 6/2013 | Goulding |
| 8,614,559 B2 | 12/2013 | Kassow et al. |
| 8,630,763 B2 | 1/2014 | Goulding |
| 8,688,273 B2 | 4/2014 | Lee et al. |
| 8,737,692 B2 | 5/2014 | Asatani |
| 8,779,715 B2 | 7/2014 | Kassow et al. |
| 9,089,968 B2 | 7/2015 | Goulding |
| 9,446,518 B1 | 9/2016 | Blankespoor |
| 9,488,987 B2 | 11/2016 | Goulding |
| 9,499,218 B1 | 11/2016 | Stephens |
| 9,527,538 B2 | 12/2016 | Kaneko et al. |
| 9,552,640 B2 | 1/2017 | Yoor |
| 9,561,592 B1 | 2/2017 | Da Silva |
| 9,594,377 B1 | 3/2017 | Perkins et al. |
| 9,630,319 B2 | 4/2017 | Vicenti |
| 9,849,926 B2 | 12/2017 | Saunders |
| 9,862,095 B2 | 1/2018 | Takagi et al. |
| 9,868,210 B1 | 1/2018 | Whitman |
| 9,878,751 B1 | 1/2018 | Thorne et al. |
| 9,908,240 B1 | 3/2018 | Da Silva |
| 9,926,025 B1 | 3/2018 | Blankespoor et al. |
| 9,975,245 B1 | 5/2018 | Whitman |
| 9,989,970 B1 | 6/2018 | Morey et al. |
| 10,081,098 B1 | 9/2018 | Nelson |
| 10,099,378 B2 | 10/2018 | Kaneko et al. |
| 10,102,429 B2 | 10/2018 | Schnittman |
| 10,126,757 B2 | 11/2018 | Goulding |
| 10,144,342 B2 | 12/2018 | Ji et al. |
| 10,179,619 B1 | 1/2019 | Urata |
| 10,196,104 B1* | 2/2019 | Kagami ............... B62D 57/032 |
| 10,327,969 B2 | 6/2019 | Galonska |
| 10,414,318 B2 | 9/2019 | Valtanen |
| 10,434,651 B1 | 10/2019 | Blankespoor et al. |
| 10,528,051 B1 | 1/2020 | Perkins et al. |
| 10,688,667 B1 | 6/2020 | Berard et al. |
| 10,908,612 B2 | 2/2021 | Palan et al. |
| 11,059,532 B1 | 7/2021 | Fay et al. |
| 11,073,842 B1 | 7/2021 | Whitman et al. |
| 11,077,898 B2 | 8/2021 | Saunders et al. |
| 11,123,869 B2 | 9/2021 | Whitman et al. |
| 11,247,344 B2 | 2/2022 | Berard et al. |
| 11,287,826 B2 | 3/2022 | Whitman et al. |
| 11,298,826 B1 | 4/2022 | Jackowski et al. |
| 11,383,381 B2 | 7/2022 | Whitman et al. |
| 11,413,570 B2 | 8/2022 | Jefferson et al. |
| 11,416,003 B2 | 8/2022 | Whitman et al. |
| 11,447,195 B2 | 9/2022 | Whitman |
| 11,548,151 B2 | 1/2023 | Whitman et al. |
| 11,599,128 B2 | 3/2023 | Whitman et al. |
| 11,660,752 B2 | 5/2023 | Whitman et al. |
| 2005/0131581 A1 | 6/2005 | Sabe et al. |
| 2006/0185911 A1 | 8/2006 | Gunderson et al. |
| 2007/0257910 A1 | 11/2007 | Gutmann et al. |
| 2008/0086241 A1 | 4/2008 | Phillips et al. |
| 2009/0321150 A1 | 12/2009 | Kwon et al. |
| 2011/0054690 A1 | 3/2011 | Gal |
| 2011/0208444 A1 | 8/2011 | Solinsky |
| 2011/0231050 A1 | 9/2011 | Goulding |
| 2012/0215355 A1 | 8/2012 | Bewley et al. |
| 2013/0116820 A1 | 5/2013 | Lee et al. |
| 2014/0277718 A1 | 9/2014 | Izhikevich et al. |
| 2015/0073592 A1 | 3/2015 | Kaneko et al. |
| 2016/0174459 A1 | 6/2016 | Balutis et al. |
| 2016/0297072 A1 | 10/2016 | Williams et al. |
| 2017/0243365 A1 | 8/2017 | Nuijten |
| 2018/0035606 A1 | 2/2018 | Burdoucci |
| 2019/0156472 A1 | 5/2019 | Link et al. |
| 2019/0256159 A1 | 8/2019 | Zhou et al. |
| 2019/0325763 A1 | 10/2019 | Hux et al. |
| 2019/0351555 A1* | 11/2019 | Blankespoor ........ B25J 9/1692 |
| 2020/0117198 A1* | 4/2020 | Whitman ............. B25J 19/021 |
| 2020/0150655 A1 | 5/2020 | Artes et al. |
| 2020/0324412 A1 | 10/2020 | Whitman et al. |
| 2020/0397202 A1 | 12/2020 | Artes et al. |
| 2021/0041887 A1 | 2/2021 | Whitman et al. |
| 2021/0096560 A1 | 4/2021 | Al-Mohssen et al. |
| 2021/0331317 A1 | 10/2021 | Whitman et al. |
| 2021/0331754 A1 | 10/2021 | Whitman |
| 2021/0333804 A1 | 10/2021 | Whitman et al. |
| 2022/0388170 A1 | 12/2022 | Merewether |
| 2022/0390952 A1 | 12/2022 | Yu et al. |
| 2022/0410390 A1 | 12/2022 | Whitman et al. |
| 2023/0008677 A1 | 1/2023 | Whitman et al. |
| 2023/0143315 A1 | 5/2023 | Whitman et al. |
| 2023/0415343 A1 | 12/2023 | Whitman et al. |

FOREIGN PATENT DOCUMENTS

| | | |
|---|---|---|
| CN | 205034207 U | 2/2016 |
| CN | 107943021 | 4/2018 |
| CN | 207780600 U | 8/2018 |
| CN | 109202901 A | 1/2019 |
| CN | 109434795 A | 3/2019 |
| CN | 106547206 B | 8/2019 |
| CN | 209615483 U | 11/2019 |
| CN | 113661462 | 11/2021 |
| CN | 115667061 | 1/2023 |
| CN | 115702405 | 2/2023 |
| CN | 115702445 | 2/2023 |
| EP | 1502843 A2 | 2/2005 |
| JP | 61257375 | 11/1986 |
| JP | S63176720 | 7/1988 |
| JP | 5318342 | 12/1993 |
| JP | H07166974 | 6/1995 |
| JP | 2003236781 | 8/2003 |
| JP | 2003340763 | 12/2003 |
| JP | 2004181600 | 7/2004 |
| JP | 2007041656 | 2/2007 |
| JP | 2007175831 A | 7/2007 |
| JP | 4295947 B2 | 7/2009 |
| JP | 4476468 B2 | 6/2010 |
| JP | 4613692 B2 | 1/2011 |
| JP | 2013072813 | 4/2013 |
| JP | 2013237126 | 11/2013 |
| JP | 2014100767 | 6/2014 |
| JP | 2015051483 | 3/2015 |
| JP | 2015054391 | 3/2015 |
| JP | 2015080832 | 4/2015 |
| JP | 7351920 | 9/2023 |
| JP | 7351920 B2 | 9/2023 |
| KR | 20100093833 | 8/2010 |
| KR | 20100093834 | 8/2010 |
| KR | 20160055731 | 5/2016 |
| KR | 20230006507 | 1/2023 |
| WO | 2003090982 A1 | 11/2003 |

(56) References Cited

FOREIGN PATENT DOCUMENTS

| | | | |
|---|---|---|---|
| WO | 2005087452 A1 | 9/2005 | |
| WO | WO 2012086604 | 6/2012 | |
| WO | 2018035320 A1 | 2/2018 | |
| WO | WO2018035320 | * 2/2018 | ........... B62D 57/032 |
| WO | WO 2020/209888 | 10/2020 | |
| WO | WO 2021/216231 | 10/2021 | |
| WO | WO 2021/216235 | 10/2021 | |
| WO | WO 2021/216264 | 10/2021 | |
| WO | WO 2024/058844 | 3/2024 | |

OTHER PUBLICATIONS

J. A. Delmerico, et al., "Ascending Stairway Modeling from Dense Depth Imagery for Traversability Analysis," 2013 IEEE International Conference on Robotics and Automation, May 6, 2013, pp. 2283-2290, doi: 10.1109/ICRA.2013.6630886 (Year: 2013).

J. Gutmann, M. Fukuchi and M. Fujita, "Stair Climbing for humanoid robots using stereo vision," 2004 IEEE/RSJ International Conference on Intelligent Robots and Systems (IROS) (IEEE Cat. No. 04CH37566), Sep. 28, 2004, pp. 1407-1413 vol. 2, doi: 10.1109/IROS.2004.1389593. (Year: 2004).

J. Gutmann, M. Fukuchi and M. Fujita, "A Floor and Obstacle Height Map for 3D Navigation of a Humanoid Robot," Proceedings of the 2005 IEEE International Conference on Robotics and Automation, Apr. 2005, pp. 1066-1071, doi: 10.1109/ROBOT.2005.1570257. (Year: 2005).

Orsolino, et al., "Feasible Region: an Actuation-Aware Extension of the Support Region," IEEE Transactions on Robotics (TRO) 2020, Mar. 19, 2019, 19 pages, doi: 10.48550/arXiv.1903.07999 (Year: 2019).

Stefan Oswald, et al., "Autonomous Climbing of Spiral Staircases with Humanoids," 2011 IEEE/RSJ International Conference on Intelligent Robots and Systems (IROS), Sep. 25, 2011, pp. 4844-4849, doi: 10.1109/IROS.2011.6048209 (Year: 2011).

Stefan Oswald, et al., "From 3D Point Clouds to Climbing Stairs: A Comparison of Plane Segmentation Approaches for Humanoids," 11th IEEE RAS International Conference on Humanoid Robots (Humanoids), Oct. 26, 2011, pp. 93-98, doi: 10.1109/HUMANOIDS.2011.6100836 (Year: 2011).

R. Heydari and M. Farrokhi, "Model predictive control for biped robots in climbing stairs," 2014 22nd Iranian Conference on Electrical Engineering (ICEE), May 2014, pp. 1209-1214, doi: 10.1109/IranianCEE.2014.6999719. (Year: 2014).

T. Ishikawa et al., "Bipedal walking control against swing foot collision using swing foot trajectory regeneration and impact mitigation," Sep. 2017 IEEE/RSJ International Conference on Intelligent Robots and Systems (IROS), Sep. 2017, pp. 4531-4537, doi: 10.1109/IROS.2017.8206320. (Year: 2017).

International Search Report, Application No. PCT/US2019/047928, dated Jan. 3, 2020, 15 pages.

International Search Report, Application No. PCT/US2021/025302, dated Aug. 11, 2021, 17 pages.

International Search Report, Application No. PCT/US2021/022953, dated Jul. 23, 2021, 15 pages.

International Search Report, Application No. PCT/US2021/022869, dated Jun. 14, 2021, 17 pages.

International Search Report & Written Opinion, Application No. PCT/US2021/022953, dated Jul. 23, 2021, 15 pages.

Complaint filed Nov. 11, 2022, Boston Dynamics, Inc. v. Ghost Robotics Corporation, Case No. 1.22-cv-01483-UNA (D. Del.), 110 pages (involving U.S. Pat. Nos. 9,308,648, 9,662,791, 11,123,869, 9,387,588, 11,073,842, 10,253,855, 11,131,368).

"Honda's Asimo Robot buckling on the stairs", https://www.youtube.com/watch?v=VTIV0Y5yAww, Dec. 12, 2006.

Obringer, et al., "How Asimo Works", https://science.howstuffworks.com/asimo.htm#pt1, printed Jan. 3, 2023 in 20 pages.

Santos et al. "Step modeling and safe path planning for a lower limb exoskeleton", 2019 19th International Conference on Advanced Robotics (ICAR), Belo Horizonte, Brazil, 2019, pp. 560-565. (Year: 2019).

Tong et al., "Real-Time Map Building for Path Planning of a Humanoid Robot", 2009 Asia-Pacific Conference on Information Processing, Shenzhen, China, 2009, pp. 211-214, doi: 10.1109/APCIP.2009.60 (Year: 2009).

Dornhege et al., "Behavior maps for online planning of obstacle negotiation and climbing on rough terrain", 2007 IEEE/RSJ International Conference on Intelligent Robots and Systems, San Diego, CA, USA, 2007, pp. 3005-3011.

Gutmann et al., "A Modular Architecture for Humanoid Robot Navigation," 5th IEEE—RAS International Conference on Humanoid Robots, Tsukuba, Japan, 2005, pp. 26-31.

International Preliminary Report on Patentability, PCT/US2021/022869, dated Oct. 25, 2022, 7 pages.

International Preliminary Report on Patentability, PCT/US2021/025302, dated Oct. 25, 2022, 10 pages.

International Preliminary Report on Patentability, PCT/US2022/022953, dated Oct. 25, 2022, 9 pages.

Office Action in European Application No. 19766387.5-1205, dated Dec. 20, 2022, 5 pages.

Office Action in Japanese No. 2021-553786, dated Jan. 5, 2023, 5 pages.

"The New Spot", https://www.youtube.com/watch?v=kgaO45SyaO4, Nov. 13, 2017, downloaded Jul. 31, 2023.

"Hey Buddy, Can You Give Me A Hand?", https://www.youtube.com/watch?v=fUyU3IKzoio, Feb. 12, 2018, downloaded Jul. 31, 2023.

"Introducing Spot (Previously SpotMini)", https://www.youtube.com/watch?v=tf7IEVTDjng, Jun. 23, 2016, downloaded Jul. 31, 2023.

"Testing Robustness", https://www.youtube.com/watch?v=aFuA50H9uek, Feb. 20, 2018, downloaded Jul. 31, 2023.

"Introducing Spot Classic (previously Spot)", https://www.youtube.com/watch?v=M8YjvHYbZ9w, Feb. 9, 2015, downloaded Aug. 10, 2023.

"SpotMini", The Wayback Machine, http://web.archive.org/web/20171118145237/https://bostondynamics.com/spot-mini, Nov. 18, 2017, downloaded Jul. 31, 2023, 3 pages.

"Behold The Future", The Wayback Machine,|http://web.archive.org/web/20161003004018/http://beholdthefuture.com/, Feb. 21, 2016, downloaded Jul. 31, 2023, 3 pages.

"Spot Autonomous Navigation", https://www.youtube.com/watch?v=Ve9kWX_KXus, May 10, 2018, pp. 3, 5, 6, 11, 13, and 14 correspond to screenshots received from the USPTO on Jun. 6, 2023 during prosecution of U.S. Appl. No. 17/933,066, pp. 1, 2, 4, 7-10, 12, and 15-17 downloaded on Jul. 31, 2023.

"ANYmal climbing stairs at Oxford Robotics," video screen shots taken from https://www.youtube.com/watch?v=MrZIWzrGb_g, Jun. 28, 2018, downloaded Nov. 6, 2023, 8 pages.

AOI et al., "Adaptive Control Strategies for Interlimb Coordination in Legged Robots: A Review," Frontiers in Neurorobotics, Aug. 2017, 21 pages, https://doi.org/10.3389/fnbot.2017.00039.

Battaglia, "Design of the Scout II Quadruped with Preliminary Stair-Climbing," McGill University, May 1999, 143 pages, https://escholarship.mcgill.ca/downloads/4f16c4825?locale=en.

Bazeille et al., "Vision Enhanced Reactive Locomotion Control for Trotting on Rough Terrain", In 2013 IEEE Conference on Technologies for Practical Robot Applications (TePRA) Apr. 22, 2013; pp. 1-6.

Bellicoso et al., "Perception-less Terrain Adaptation through Whole Body Control and Hierarchical Optimization.," 2016 IEEE-RAS 16th International Conference on Humanoid Robots (Humanoids), Nov. 2016, pp. 558-564, doi: 10.1109/HUMANOIDS.2016.7803330.

Bellicoso et al., "Dynamic locomotion through online nonlinear motion optimization for quadrupedal robots," IEEE Robotics and Automation Letters, Jul. 2018, vol. 3, No. 3, pp. 2261-2268, doi: 10.1109/LRA.2018.2794620.

"Boston Dynamics: The Coming Robot Revolution—Marc Raibert," video screen shots taken from https://www.youtube.com/watch?v=FahbCJ330Vg, Nov. 14, 2017, downloaded Jan. 31, 2024, 7 pages.

(56) References Cited

OTHER PUBLICATIONS

Brewer, "Development Of A Quadruped Robot And Parameterized Stair-Climbing Behavior," University of Maryland, Jan. 2011, 132 pages, https://drum.lib.umd.edu/bitstreams/023eee39-6342-4d49-b7b3-cfc95077d988/download.

Camurri M., "Multisensory State Estimation and Mapping on Dynamic Legged Robots", Thesis for Doctor of Philosophy, University of Genova, Italy, Mar. 2017, 1-145 pages.

Di Carlo et al., "Dynamic Locomotion in the MIT Cheetah 3 Through Convex Model-Predictive Control," 2018 IEEE/RSJ International Conference on Intelligent Robots and Systems (IROS), Madrid, Spain, 2018, pp. 1-9, doi: 10.1109/IROS.2018.8594448.

"Dynamic Locomotion in the MIT Cheetah 3 Through Convex Model Predictive Control," video screen shots taken from https://www.youtube.com/watch?v=q6zxCvCxhic, Sep. 9, 2019, downloaded Nov. 6, 2023, 16 pages.

Eich et al., "Adaptive compliance control of a multi-legged stair-climbing robot based on proprioceptive data," Industrial Robot, Jun. 2009, vol. 36 No. 4, pp. 331-339. https://doi.org/10.1108/01439910910957084.

Ellenberg, "A Stability-Estimator to Unify Humanoid Locomotion: Walking, Stair-Climbing and Ladder-Climbing," Drexel University, Jun. 2014, 106 pages, DOI: https://doi.org/10.17918/etd-4538.

Fankhauser et al., "Robot-Centric Elevation Mapping with Uncertainty Estimates", In Mobile Service Robotics Apr. 17, 2014; pp. 433-440.

Fankhauser et al., "Free Gait—An Architecture for the Versatile Control of Legged Robots," 2016 IEEE-RAS 16th International Conference on Humanoid Robots (Humanoids), Nov. 2016, pp. 1052-1058, doi: 10.1109/HUMANOIDS.2016.7803401.

Fankhauser et al., "Robust Rough-Terrain Locomotion with a Quadrupedal Robot," 2018 IEEE International Conference on Robotics and Automation (ICRA), Brisbane, QLD, Australia, 2018, pp. 5761-5768, doi: 10.1109/ICRA.2018.8460731.

Focchi et al., "Heuristic Planning for Rough Terrain Locomotion in Presence of External Disturbances and Variable Perception Quality", Advances in Robotics Research: From Lab to Market: ECHORD++: Robotic Science Supporting Innovation. 2020; pp. 165-209.

Gehring et al., "Quadrupedal Locomotion using Trajectory Optimization and Hierarchical Whole Body|Control," 2017 IEEE International Conference on Robotics and Automation (ICRA), May 2017, pp. 4788-4794, doi: 10.1109/ICRA.2017.7989557.

Gutmann et al., "Real-Time Path Planning for Humanoid Robot Navigation," IJCAI, pp. 1232-1237. 2005, https://www.ijcai.org/Proceedings/05/Papers/0974.pdf.

Haynes et al., "Multistable Phase Regulation for Robust Steady and Transitional Legged Gaits.," The International Journal of Robotics Research, Sep. 2012, vol. 31, Issue 14, pp. 1712-1738, https://doi.org/10.1177/0278364912458463.

Hodgins et al., "Adjusting Step Length for Rough Terrain Locomotion," IEEE Transactions on Robotics and Automation, Jun. 1991, vol. 7, No. 3, pp. 289-298, doi: 10.1109/70.88138.

Hutter et al., "ANYmal—A Highly Mobile and Dynamic Quadrupedal Robot", In2016 IEEE/RSJ international conference on intelligent robots and systems (IROS) Oct. 9, 2016; pp. 38-44.

Ilyas et al., "Design of sTetro: A Modular, Reconfigurable, and Autonomous Staircase Cleaning Robot," Journal of Sensors, Jul. 2018, 25 pages, https://doi.org/10.1155/2018/8190802.

"Introducing Spot Classic (Previously Spot)", video screen shots taken from https://www.youtube.com/watch?v=M8YjvHYbZ9w, Feb. 9, 2015, downloaded Aug. 10, 2023, 14 pages.

Kaslin et al., "Towards a Passive Adaptive Planar Foot with Ground Orientation and Contact Force Sensing for Legged Robots," 2018 IEEE/RSJ International Conference on Intelligent Robots and Systems (IROS), Oct. 2018, pp. 2707-2714, doi: 10.1109/IROS.2018.8593875.

Kim et al., "Realization of Dynamic Stair Climbing for Biped Humanoid Robot Using Force/Torque Sensors," Journal of Intelligent and Robotic Systems, Apr. 2009, vol. 56, pp. 389-423, DOI:10.1007/s10846-009-9324-z.

Kolter et al., "Stereo Vision and Terrain Modeling for Quadruped Robots," 2009 IEEE International Conference on Robotics and Automation, Kobe, 2009, pp. 1557-1564, doi: 10.1109/ROBOT.2009.5152795.

Kolter et al., "The Stanford Little Dog: A Learning and Rapid Replanning Approach to Quadruped Locomotion," International Journal of Robotics Research (First published online Jan. 25, 2011), https://journals.sagepub.com/doi/10.1177/0278364910390537.

Lee et al., "Robust Recovery Controller for a Quadrupedal Robot using Deep Reinforcement Learning," arXiv.org, Jan. 2019, 8 pages, https://doi.org/10.48550/arXiv.1901.07517.

"Legged Robot ANYmal Climbing Stairs in Zurich," video screen shots taken from https://www.youtube.com/watch?v=vSveQrJLRTo, Jan. 17, 2018, downloaded Nov. 6, 2023, 6 pages.

Li et al., "A Kinect-sensor-based Tracked Robot for Exploring and Climbing Stairs," International Journal of Advanced Robotic Systems, Jan. 2014, 11(5), 11 pages, doi:10.5772/58583.

"Meet Spot, the robot dog that can run, hop and open doors | Marc Raibert," video screen shots taken from https://www.youtube.com/watch?v=AO4In7d6X-c, Aug. 14, 2017, downloaded Jan. 31, 2024, 5 pages.

Michel et al., "GPU-Accelerated Real-Time 3D Tracking for Humanoid Locomotion and Stair Climbing," 2007 IEEE/RSJ International Conference on Intelligent Robots and Systems, San Diego, CA, USA, 2007, pp. 463-469, doi: 10.1109/IROS.2007.4399104.

Pack D.J., "Sensor-Based Planning And Control For A Quadruped Walking Robot," Purdue University, 1996, 190 pages; https://dl.acm.org/doi/book/10.5555/240733.

Raibert et al., "Dynamically Stable Legged Locomotion," The Leg Laboratory, Report LL-6, Sep. 1989, 207 pages, https://apps.dtic.mil/sti/tr/pdf/ADA225713.pdf.

Ren et al., "Toward Robust Stair Climbing of the Quadruped using Proprioceptive Sensing," Technical Report Carnegie Mellon University Robotics Institute Summer Scholars Working Papers Journal, vol. 6, Fall 2018, pp. 112-118, https://bibbase.org/network/publication/ren-johnson-towardrobuststairclimbingofthequadrupedusingproprioceptivesensing-2018.

"Robust Rough-Terrain Locomotion with a Quadrupedal Robot (ANYmal)," video screen shots taken from https://www.youtube.com/watch?v=CpzQu25iLa0, Sep. 19, 2017, downloaded Nov. 6, 2023, 14 pages.

Shih et al., "Ascending and Descending Stairs for a Biped Robot," IEEE Transactions on Systems, Man, and Cybernetics—Part A: Systems and Humans, May 1999, vol. 29, No. 3, pp. 255-268, doi: 10.1109/3468.759271.

Shkolnik et al., "Bounding on rough terrain with the LittleDog robot," The International Journal of Robotics Research, Dec. 2010, 30(2) pp. 192-215, doi:10.1177/0278364910388315.

Stoeter et al., "Autonomous Stair-Climbing with Miniature Jumping Robots," IEEE Transactions on Systems, Man, and Cybernetics, Part B (Cybernetics), Apr. 2005, vol. 35, No. 2, pp. 313-325, doi: 10.1109/TSMCB.2004.843270.

"The Spot by Boston Dynamics comes on stage at Disrupt SF," video screen shots taken from https://www.youtube.com/watch?v=3Q0ZC_wDoGI, Sep. 14, 2016, downloaded Jan. 31, 2024, 4 pages.

Vatankhah M., "Synergy Pattern Identification Of Hip, Knee, Ankle Joints During Human Stair Ascent As A Bio-Inspired Model For Humanoid Robots," Stevens Institute of Technology, 2018, 104 pages, ISBN: 9780438259966.

"Vision-free MIT Cheetah," video screen shots taken from https://www.youtube.com/watch?v=QZ1DaQgg3IE, Jul. 5, 2018, downloaded Jan. 16, 2024, 25 pages.

Zeng et al., "Leg Trajectory Planning for Quadruped Robots with High-Speed Trot Gait," Applied Sciences, Apr. 2019, 21 pages, doi: 10.3390/app9071508.

Answer in *Boston Dynamics, Inc.* v. *Ghost Robotics Corporation*, Case No. 1.22-cv-01483-UNA (D. Del.), Feb. 10, 2023, 28 pages (involving U.S. Pat. Nos. 9,308,648, 9,662,791, 11,123,869, 9,387,588, 11,073,842, 10,253,855, 11,131,368).

Amended Answer in *Boston Dynamics, Inc.* v. *Ghost Robotics Corporation*, Case No. 1.22-cv-01483-UNA (D. Del.), Mar. 3, 2023, 25 pages (involving U.S. Pat. Nos. 9,308,648, 9,662,791, 11,123,869, 9,387,588, 11,073,842, 10,253,855, 11,131,368).

(56) References Cited

OTHER PUBLICATIONS

Defendant Ghost Robotics Corporation's Initial Invalidity Contentions in *Boston Dynamics, Inc.* v. *Ghost Robotics Corporation*, Case No. 1.22-cv-01483-UNA (D. Del.), Sep. 19, 2023, 48 pages (involving U.S. Pat. Nos. 9,308,648, 9,662,791, 11,123,869, 9,387,588, 11,073,842, 10,253,855, 11,131,368).
Second Amended Answer in *Boston Dynamics, Inc.* v. *Ghost Robotics Corporation*, Case No. 1.22-cv-01483-UNA (D. Del.), Oct. 18, 2023, 83 pages (involving U.S. Pat. Nos. 9,308,648, 9,662,791, 11,123,869, 9,387,588, 11,073,842, 10,253,855, 11,131,368).
Exhibit C1 (Redacted) in *Boston Dynamics, Inc.* v. *Ghost Robotics Corporation*, Case No. 1.22-cv-01483-UNA (D. Del.), Sep. 19, 2023, 42 pages (involving U.S. Pat. Nos. 9,308,648, 9,662,791, 11,123,869, 9,387,588, 11,073,842, 10,253,855, 11,131,368).
Exhibit C2 in *Boston Dynamics, Inc.* v. *Ghost Robotics Corporation*, Case No. 1.22-cv-01483-UNA (D. Del.), Sep. 19, 2023, 36 pages (involving U.S. Pat. Nos. 9,308,648, 9,662,791, 11, 123,869, 9,387,588, 11,073,842, 10,253,855, 11,131,368).
Exhibit C3 in *Boston Dynamics, Inc.* v. *Ghost Robotics Corporation*, Case No. 1.22-cv-01483-UNA (D.Del.) Sep. 19, 2023, 42 pages (involving U.S. Pat. Nos. 9,308,648, 9,662,791, 11,123,869, 9,387,588, 11,073,842, 10,253,855, 11,131,368).
Exhibit E1 in *Boston Dynamics, Inc.* v. *Ghost Robotics Corporation*, Case No. 1.22-cv-01483-UNA (D.Del.), Sep. 19, 2023, 90 pages (involving U.S. Pat. Nos. 9,308,648, 9,662,791, 11,123,869, 9,387,588, 11,073,842, 10,253,855, 11,131,368).
Exhibit E2 in *Boston Dynamics, Inc.* v. *Ghost Robotics Corporation*, Case No. 1.22-cv-01483-UNA (D. Del.), Sep. 19, 2023, 80 pages (involving U.S. Pat. Nos. 9,308,648, 9,662,791, 11,123,869, 9,387,588, 11,073,842, 10,253,855, 11,131,368).
Exhibit E3 in *Boston Dynamics, Inc.* v. *Ghost Robotics Corporation*, Case No. 1.22-cv-01483-UNA (D. Del.), Sep. 19, 2023, 75 pages (involving U.S. Pat. Nos. 9,308,648, 9,662,791, 11,123,869, 9,387,588, 11,073,842, 10,253,855, 11,131,368).
Defendant Ghost Robotics Corporation's Supplemental Identification of Invalidity References in *Boston Dynamics, Inc.* v. *Ghost Robotics Corporation*, Case No. 1.22-cv-01483-UNA (D. Del.), Jan. 19, 2024, 23 pages (involving U.S. Pat. Nos. 9,308,648, 9,662,791, 11,123,869, 9,387,588, 11,073,842, 10,253,855, 11,131,368).
Request for Ex Parte Reexamination in U.S. Pat. No. 11660752 by Ghost Robotics Corporation, filed Dec. 31, 2023, 49 pages.
Declaration of Dr. Darwin Caldwell in Support of Ex Parte Reexamination in U.S. Pat. No. 11660752, filed Dec. 31, 2023, 27 pages.
Bazeille, et al., "Quadruped Robot Trotting Over Irregular Terrain Assisted by Stereo-Vision," Intelligent Service Robotics, Mar. 2014, 12 pages, https://iit-dlslab.github.io/papers/bazeille14isr.pdf.
"Boston Dynamics Spot Mini at MIT AGI lecture," video screen shots taken from https://www.youtube.com/watch?v=I_16-iwyKvc, Feb. 18, 2018, downloaded Apr. 17, 2024, 3 pages.
"Google-owned robot lab Boston Dynamics shows off its Spot Mini prototype at TechCrunch Disrupt,"video screen shots taken from https://www.youtube.com/watch?v=qNo-muuj128, Dec. 5, 2016, downloaded Apr. 17, 2024, 4 pages.
Gutmann et al., "Stair Climbing for humanoid robots using stereo vision," 2004 IEEE/RSJ International Conference on Intelligent Robots and Systems (IROS) (IEEE Cat. No. 04CH37566), Sep. 28, 2004, pp. 1407-1413 vol. 2, doi: 10.1109/IROS.2004.1389593. (Year: 2004).
Ko, et al., "Trajectory Planning and Four-Leg Coordination for Stair Climbing in a Quadruped Robot," 2010 IEEE/RSJ International Conference on Intelligent Robots and Systems, Oct. 2010, 6 pages, http://peichunlin.me.ntu.edu.tw/homepage/research/Publication/2010%20IROS.pdf.
Lan et al., "Novel design of a wheeled robot with double swing arms capable of autonomous stair climbing," Proceedings of the 2018 International Conference on Mechatronic Systems and Robots May 25, 2018 (pp. 110-114) https://doi.org/10.1145/3230876.3230899.

Marion, et al., "Director: A User Interface Designed for Robot Operation with Shared Autonomy," Journal of Field Robotics, Dec. 2016, 25 pages, https://groups.csail.mit.edu/robotics-center/public_papers/Marion16.pdf.
Qi et al., "Perceptive autonomous stair climbing for quadrupedal robots," 2021 IEEE/RSJ InternationalConference on Intelligent Robots and Systems (IROS) Sep. 27, 2021 (pp. 2313-2320) https://doi.org/10.1109/IROS51168.2021.9636302.
"Silicon Valley—Erlich hits the robotic deer," video screen shots taken from https://www.youtube.com/watch?v=-mHYoXedZ10, Apr. 30, 2016, downloaded Apr. 17, 2024, 8 pages.
Suganuma, et al., "A Remote Operated Quadruped Robot System for Investigation of Reactor Building," 2014 22nd International Conference on Nuclear Engineering, Jul. 2014, 4 pages, https://citeseerx.ist.psu.edu/document?repid=rep1&type=pdf&doi=fdade07033b9a6cfaeb3f414261317e4967f8c03.
Thu et al., "Autonomous stairs ascending and descending algorithm for tri-star wheeled robot," 2018 3rd International Conference on Advanced Robotics and Mechatronics (ICARM) Jul. 18, 2018 (pp. 328-333) https://doi.org/10.1109/ICARM.2018.8610676.
Communication Relating to the Results of the Partial International Search for PCT/US2023/025760, dated Apr. 9, 2024, 15 pages.
Defendant Ghost Robotics Corporation's Final Invalidity Contentions in *Boston Dynamics, Inc.* v. *Ghost Robotics Corporation*, Case No. 1.22-cv-01483-UNA (D. Del.), Mar. 7, 2024, 81 pages (involving U.S. Pat. Nos. 9,308,648, 9,662,791, 11,123,869, 9,387,588, 11,073,842, 10,253,855, 11,131,368).
Exhibit C1(i) (Redacted), *Boston Dynamics, Inc.* v. *Ghost Robotics Corporation*, Case No. 1.22-cv-01483-UNA (D. Del.), Mar. 7, 2024, 44 pages (involving U.S. Pat. Nos. 9,308,648, 9,662,791, 11,123,869, 9,387,588, 11,073,842, 10,253,855, 11,131,368).
Exhibit C1(ii) (Redacted), *Boston Dynamics, Inc.* v. *Ghost Robotics Corporation*, Case No. 1.22-cv-01483-UNA (D. Del.), Mar. 7, 2024, 54 pages (involving U.S. Pat. Nos. 9,308,648, 9,662,791, 11,123,869, 9,387,588, 11,073,842, 10,253,855, 11,131,368).
Exhibit C1(iii) (Redacted), *Boston Dynamics, Inc.* v. *Ghost Robotics Corporation*, Case No. 1.22-cv-01483-UNA (D. Del.), Mar. 7, 2024, 86 pages (involving U.S. Pat. Nos. 9,308,648, 9,662,791, 11,123,869, 9,387,588, 11,073,842, 10,253,855, 11,131,368).
Exhibit C2 (Redacted), *Boston Dynamics, Inc.* v. *Ghost Robotics Corporation*, Case No. 1.22-cv-01483-UNA (D. Del.), Mar. 7, 2024, 38 pages (involving U.S. Pat. Nos. 9,308,648, 9,662,791, 11,123,869, 9,387,588, 11,073,842, 10,253,855, 11,131,368).
Exhibit C3 (Redacted), *Boston Dynamics, Inc.* v. *Ghost Robotics Corporation*, Case No. 1.22-cv-01483-UNA (D. Del.), Mar. 7, 2024, 44 pages (involving U.S. Pat. Nos. 9,308,648, 9,662,791, 11,123,869, 9,387,588, 11,073,842, 10,253,855, 11,131,368).
Exhibit E1, *Boston Dynamics, Inc.* v. *Ghost Robotics Corporation*, Case No. 1.22-cv-01483-UNA (D. Del.), Mar. 7, 2024, 115 pages (involving U.S. Pat. Nos. 9,308,648, 9,662,791, 11,123,869, 9,387,588, 11,073,842, 10,253,855, 11,131,368).
Exhibit E2, *Boston Dynamics, Inc.* v. *Ghost Robotics Corporation*, Case No. 1.22-cv-01483-UNA (D. Del.), Mar. 7, 2024, 63 pages (involving U.S. Pat. Nos. 9,308,648, 9,662,791, 11,123,869, 9,387,588, 11,073,842, 10,253,855, 11,131,368).
Exhibit E3, *Boston Dynamics, Inc.* v. *Ghost Robotics Corporation*, Case No. 1.22-cv-01483-UNA (D. Del.), Mar. 7, 2024, 84 pages (involving U.S. Pat. Nos. 9,308,648, 9,662,791, 11,123,869, 9,387,588, 11,073,842, 10,253,855, 11,131,368).
Exhibit E4, *Boston Dynamics, Inc.* v. *Ghost Robotics Corporation*, Case No. 1.22-cv-01483-UNA (D. Del.), Mar. 7, 2024, 93 pages (involving U.S. Pat. Nos. 9,308,648, 9,662,791, 11,123,869, 9,387,588, 11,073,842, 10,253,855, 11,131,368).
Order Granting Request for Ex Parte Reexamination in U.S. Pat. No. 11,660,752 by Ghost Robotics Corporation, mailed Feb. 20, 2024, 18 pages.

* cited by examiner

IDENTIFYING STAIRS FROM FOOTFALLS

CROSS REFERENCE TO RELATED APPLICATIONS

This U.S. patent application claims priority under 35 U.S.C. § 119(e) to U.S. Provisional Application 63/012,614, filed on Apr. 20, 2020, which is hereby incorporated by reference in its entirety.

TECHNICAL FIELD

This disclosure relates to identifying stairs from footfalls.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles or features requiring various means of coordinated leg movement provides additional benefits to such industries.

SUMMARY

One aspect of the disclosure provides a method of identifying stairs from footfalls. The method includes receiving, at data processing hardware, a plurality of footfall locations of a robot traversing an environment. Here, each respective footfall location indicates a location where a leg of the robot contacted a support surface beneath the robot. The method also includes determining, by the data processing hardware, a plurality of candidate footfall location pairs based on the plurality of footfall locations. The candidate footfall location pair may also include a respective first candidate footfall location and a respective second candidate footfall location. The method also includes clustering, by the data processing hardware, the respective first candidate footfall location into a first respective cluster group based on a height of the respective first candidate footfall location. The method further includes clustering, by the data processing hardware, the respective second candidate footfall location into a second respective cluster group based on a height of the respective second candidate footfall location. The method additionally includes generating, by the data processing hardware, a stair model by representing each of the cluster groups as a corresponding stair among a set of stairs in the robot environment and delineating each stair based on a respective midpoint between each adjacent cluster group.

Implementations of the disclosure may include one or more of the following optional features. In some examples, the method may further include for each pair of adjacent footfall locations defined by a respective first footfall location and a respective second footfall location adjacent to the respective first footfall location in position among the plurality of footfall locations, determining, by the data processing hardware, whether a vertical distance between the respective first footfall location and the respective second footfall location satisfies a stair height threshold, the stair height threshold corresponding to a height of a stair riser. In some configurations the method also includes determining, by the data processing hardware, whether a horizontal distance between the respective first footfall location and the respective second footfall location satisfies a stair depth threshold where the stair depth threshold corresponds to a depth of a stair tread. Optionally, when both (i) the vertical distance satisfies the stair height threshold and (ii) the horizontal distance satisfies the stair depth threshold, the method may include identifying, by the data processing hardware, the respective pair of adjacent footfall locations as a respective one of the plurality of candidate footfall location pairs.

In some implementations, a plurality of cluster groups indicate an orientation for the stair model, the orientation corresponding to a vector direction that a set of stairs ascend or descend within the environment. Here, after clustering each of the respective first and second footfall locations into the respective cluster groups for each candidate footfall location pair of the plurality of candidate pairs, the method may include identifying, by the data processing hardware, among the respective cluster groups, a first cluster group and a second cluster group adjacent to the first cluster group, the identified first and second clustered groups each may include one or more respective candidate footfall locations. The method further includes determining, by the data processing hardware, a respective first candidate footfall location among the one or more candidate footfall locations in the first cluster group and a respective second candidate footfall location among the one or more candidate footfall locations in the second cluster group, the respective first candidate footfall location separated by a minimum horizontal distance from the respective second candidate footfall location, and generating, by the data processing hardware, a stair edge for the stair model at a horizontal midpoint between the identified respective first candidate footfall location in the first cluster group and the identified respective second candidate footfall location in the second cluster group. Optionally, a plurality of cluster groups indicate an orientation for the stair model, the orientation corresponding to a vector direction that a set of stairs ascend or descend within the environment, and the stair edge extending in a direction perpendicular to the vector direction of the orientation for the plurality of cluster groups.

Additionally, the method may include communicating, by the data processing hardware, the stair model to a control system for the robot to navigate the stairs represented by the stair model in an autonomous drive mode. The method further includes, after generating the stair model, while the robot traverses the environment, detecting, by the data processing hardware, that the robot is approaching a location represented by the stair model and orienting, by the data processing hardware, the robot to an orientation for the stair model, the orientation corresponding to a vector direction that the set of stairs ascend or descend within the environment. In some examples, orienting the robot may include directing sensors on the robot to face the vector direction defined by the stair model. The method may include augmenting, by the data processing hardware, a perception map of the environment with the stair model. In some implementations, the robot is a quadruped robot.

Another aspect of the disclosure provides a robot configured to identify stairs from footfalls. The robot includes a body, two or more legs coupled to the body and configured to traverse an environment, and a stair modeling system in communication with the robot. The modeling system includes data processing hardware and memory hardware in communication with the data processing hardware, the memory hardware storing instructions that when executed on the data processing hardware cause the data processing hardware to perform operations. The operations include receiving a plurality of footfall locations of the two or more legs traversing the environment, each respective footfall location indicating a location where one of the two of more legs of the robot contacted a support surface beneath the robot. The operations also include determining a plurality of candidate footfall location pairs based on the plurality of footfall locations, each candidate footfall location pair including a respective first candidate footfall location and a respective second candidate footfall location. For each candidate footfall location pair of the plurality of candidate footfall location pairs, the operations additionally include clustering the respective first candidate footfall location into a first respective cluster group based on a height of the respective first candidate footfall location and clustering the respective second candidate footfall location into a second respective cluster group based on a height of the respective second candidate footfall location. The operations also includes generating a stair model by representing each of the cluster groups as a corresponding stair among a set of stairs in the robot environment and delineating each stair based on a respective midpoint between each adjacent cluster group.

Implementations of the disclosure may include one or more optional features. In some implementations, for each pair of adjacent footfall locations defined by a respective first footfall location and a respective second footfall location adjacent to the respective first footfall location in position among the plurality of footfall locations, the operations include determining whether a vertical distance between the respective first footfall location and the respective second footfall location satisfies a stair height threshold, the stair height threshold corresponding to a height of a stair riser. The operations also include determining whether a horizontal distance between the respective first footfall location and the respective second footfall location satisfies a stair depth threshold, the stair depth threshold corresponding to a depth of a stair tread and when both (i) the vertical distance satisfies the stair height threshold and (ii) the horizontal distance satisfies the stair depth threshold, identifying the respective pair of adjacent footfall locations as a respective one of the plurality of candidate footfall location pairs.

In some examples, a plurality of cluster groups indicate an orientation for the stair model where the orientation corresponding to a vector direction that a set of stairs ascend or descend within the environment. In some configurations, after clustering each of the respective first and second footfall locations into the respective cluster groups for each candidate footfall location pair of the plurality of candidate pairs, the operations also include identifying among the respective cluster groups, a first cluster group and a second cluster group adjacent to the first cluster group. In these examples, the identified first and second clustered groups each may include one or more respective candidate footfall locations. Here, the operations may further include determining a respective first candidate footfall location among the one or more candidate footfall locations in the first cluster group and a respective second candidate footfall location among the one or more candidate footfall locations in the second cluster group. Additionally or alternatively, the operations may also include a respective first candidate footfall location separated by a minimum horizontal distance from the respective second candidate footfall location and generating a stair edge for the stair model at a horizontal midpoint between the identified respective first candidate footfall location in the first cluster group and the identified respective second candidate footfall location in the second cluster group.

In some configurations, a plurality of cluster groups indicate an orientation for the stair model where the orientation corresponds to a vector direction that a set of stairs ascend or descend within the environment. Here, the stair edge extends in a direction perpendicular to the vector direction of the orientation for the plurality of cluster groups. The operations further may include communicating the stair model to a control system for the robot to navigate the stairs represented by the stair model in an autonomous drive mode. The operations further may include, after generating the stair model, while the robot traverses the environment, detecting that the robot is approaching a location represented by the stair model and orienting the robot to an orientation for the stair model, the orientation corresponding to a vector direction that the set of stairs ascend or descend within the environment. Orienting the robot may include directing sensors on the robot to face the vector direction defined by the stair model. Optionally, the operations may include augmenting a perception map of the environment with the stair model. In some examples, the two or more legs may include four legs defining a quadruped robot.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As legged-robots maneuver about environments, the robots may encounter terrain (e.g., human-made structures) that requires precise leg movement and foot placement (i.e., distal end placement). To provide precise leg movement and foot placement, when systems of the robot recognize different types of terrain, the movement control systems of the robot may constrain the robot's movement to traverse the terrain in order to prevent mistakes, even small mistakes, which may lead to catastrophic issues for the robot. For example, when humans traverse stairs, this task requires a degree of coordination (e.g., eye-to-foot coordination). Without the coordination, a human may misstep, slip, trip, or fall on the stairs. Robots may encounter the same misfortunes, but lack natural coordination. Therefore, robots need systems and methods to coordinate precise leg movements.

Figure 1A:
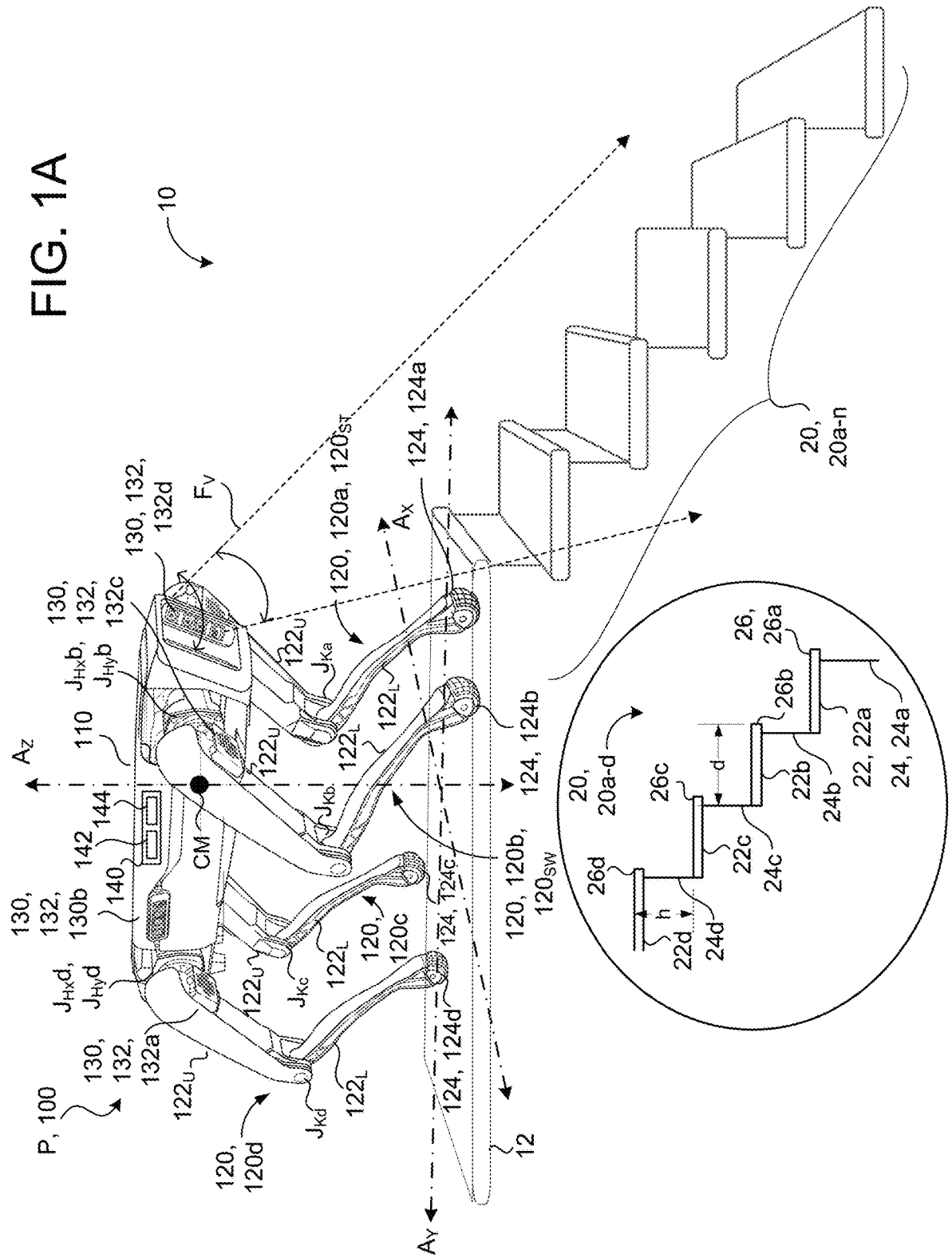
FIG. 1A is a perspective view of an example robot standing atop a landing of a staircase.
Figure 1B:
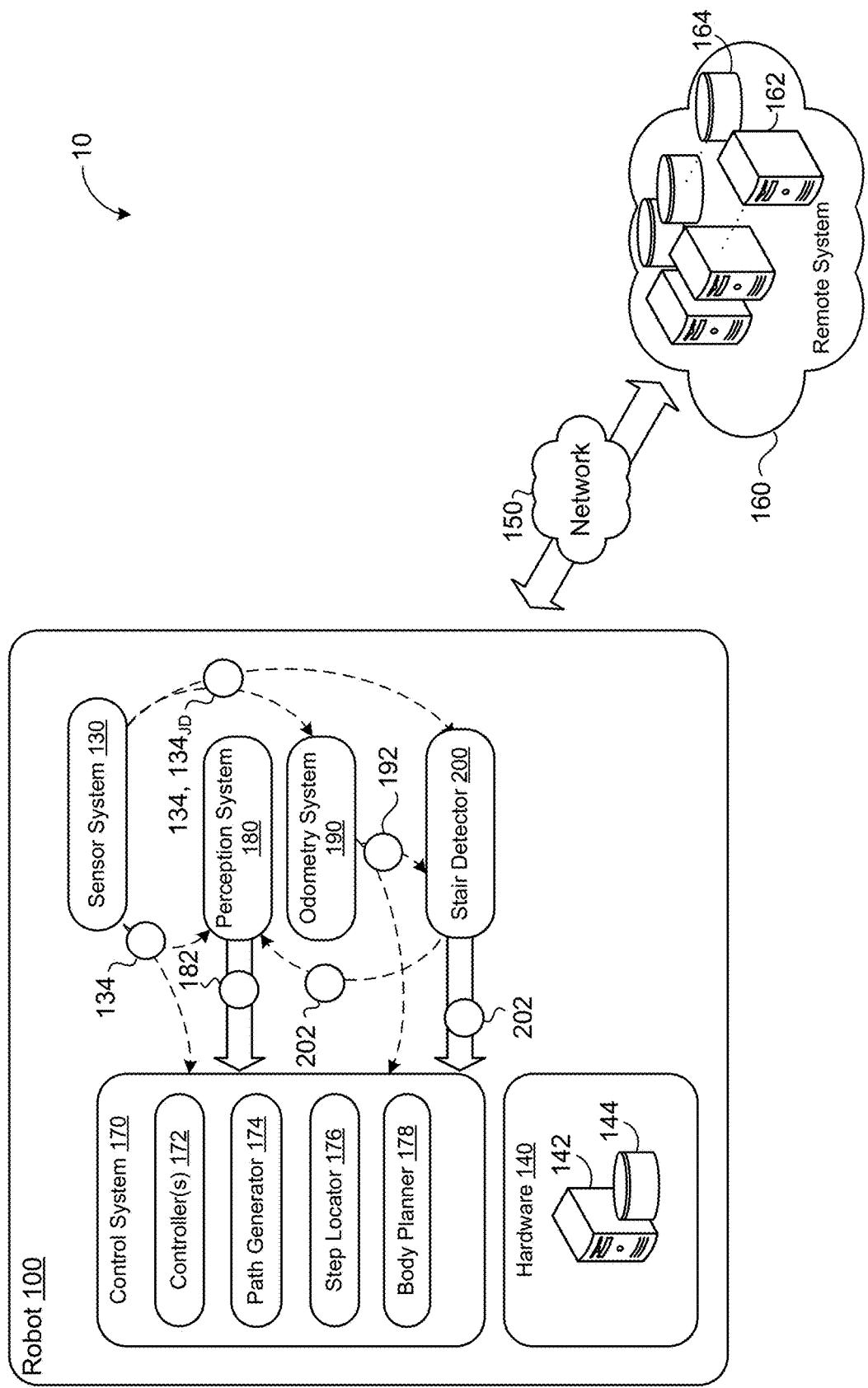
FIG. 1B is a schematic view of example systems of the robot of FIG. 1A.

FIG. 1A is an example of an environment 10 for a robot 100. The environment 10 generally refers to a spatial area associated with some type of terrain including stairs 20, 20a-n or stair-like terrain that may be traversed by the robot 100 (e.g., using a control system 170 as shown in FIG. 1B). Systems of the robot 100 are responsible for coordinating and/or moving the robot 100 about the environment 10. As the robot 100 traverses stairs 20 or stair-like terrain and moves about the environment 10, systems of the robot 100 may analyze the terrain, plan motion trajectories for the robot 100 (e.g., with a path generator 174, a step planner 176, a body planner 178), and/or instruct the robot 100 to perform various movements (e.g., with a controller 172). The robot 100 may use various systems of the robot 100 together to attempt to successfully traverse the environment 10 while avoiding collisions C and/or damage to the robot 100 or the robot's environment 10.

Stairs 20, 20a-n generally refer to a group of more than one stair 20 (i.e., a group of n stairs 20) designed to bridge a vertical distance. To bridge the vertical distance, stairs 20a-n typically run a horizontal distance with a given rise in vertical height over a pitch (or pitch line). Each stair 20 traditionally includes a tread 22 and a riser 24. The tread 22 of a stair 20 refers to a horizontal part of the stair 20 that is stepped on while a riser 24 refers to a vertical portion of the stair 20 between each tread 22. The tread 22 of each stair 20 spans a tread depth "d" measuring from an outer edge 26 of a stair 20 to the riser 24 between stairs 20. For a residential, a commercial, or an industrial structure, some stairs 20 also include nosing as part of the edge 26 for safety purposes. Nosing, as shown in FIG. 1A, is a part of the tread 22 that protrudes over a riser 24 beneath the tread 22. For example, the nosing (shown as edge 26a) is part of the tread 22a and protrudes over the riser 24a. A set of stairs 20 may be preceded by or include a platform or support surface 12 (e.g., a level support surface). For example, a landing refers to a level platform or support surface 12 at a top of a set of stairs 20 or at a location between stairs 20. For instance, a landing occurs where a direction of the stairs 20 change or between a particular number of stairs 20 (i.e., a flight of stairs 20 that connects two floors). FIG. 1A illustrates the robot 100 standing on a landing at the top of a set of stairs 20.

Stair-like terrain more generally refers to terrain that varies in height over some distance. Stair-like terrain may resemble stairs in terms of a change in elevation (e.g., an inclined pitch with a gain in elevation or a declined pitch with a loss in elevation). However, with stair-like terrain the delineation of treads 22 and risers 24 is not as obvious. Rather, stair-like terrain may refer to terrain with tread-like portions that allow a robot to have enough traction to plant a stance limb and sequentially or simultaneously use a leading limb to ascend or to descend over an adjacent vertical obstruction (resembling a riser) within the terrain. For example, stair-like terrain my include rubble, an inclined rock scramble, damaged or deteriorating traditional stairs, etc.

Referring to FIG. 1A, the robot 100 includes a body 110 with locomotion based structures such as legs 120a-d coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. For impact detection, the hip joint $J_H$ may be further broken down into abduction-adduction rotation of the hip joint $J_H$ designated as "$J_{Hx}$" for occurring in a frontal plane of the robot 100 (i.e., a X-Z plane extending in directions of a x-direction axis $A_x$ and the z-direction axis $A_Z$) and a flexion-extension rotation of the hip joint $J_H$ designated as "$J_{Hy}$" for occurring in a sagittal plane of the robot 100 (i.e., a Y-Z plane extending in directions of a y-direction axis $A_Y$ and the z-direction axis $A_Z$). Although FIG. 1A depicts a quadruped robot with four legs 120a-d, the robot 100 may include any number of legs or locomotive based structures (e.g., a biped or humanoid robot with two legs) that provide a means to traverse the terrain within the environment 10.

In order to traverse the terrain, each leg 120 has a distal end 124 that contacts a surface 12 of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $122_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height (i.e., vertical distance) generally refers to a distance along (e.g., parallel to) the z-direction (i.e., z-axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a support surface 12 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_z$.

When a legged-robot moves about the environment 10, the legs 120 of the robot undergo a gait cycle. Generally, a gait cycle begins when a leg 120 touches down or contacts a support surface 12 and ends when that same leg 120 once again contacts the ground surface 12. Here, touchdown is also referred to as a footfall defining a point or position where the distal end 124 of a locomotion-based structure 120 falls into contact with the support surface 12. The gait cycle may predominantly be divided into two phases, a swing phase and a stance phase. During the swing phase, a leg 120 performs (i) lift-off from the support surface 12 (also sometimes referred to as toe-off and the transition between the stance phase and swing phase), (ii) flexion at a knee joint $J_K$ of the leg 120, (iii) extension of the knee joint $J_K$ of the leg 120, and (iv) touchdown (or footfall) back to the support surface 12. Here, a leg 120 in the swing phase is referred to as a swing leg $120_{SW}$. As the swing leg $120_{SW}$ proceeds through the movement of the swing phase $120_{SW}$, another leg 120 performs the stance phase. The stance phase refers to a period of time where a distal end 124 (e.g., a foot) of the leg 120 is on the support surface 12. During the stance phase a leg 120 performs (i) initial support surface contact which triggers a transition from the swing phase to the stance phase, (ii) loading response where the leg 120 dampens support surface contact, (iii) mid-stance support for when the contralateral leg (i.e., the swing leg $120_{SW}$) lifts-off and swings to a balanced position (about halfway through the swing phase), and (iv) terminal-stance support from when the robot's COM is over the leg 120 until the contralateral leg 120 touches down to the support surface 12. Here, a leg 120 in the stance phase is referred to as a stance leg $120_{ST}$.

In order to maneuver about the environment 10, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some configurations, the robot 100 includes two stereo cameras as sensors 132 at a front end of the body 110 of the robot 100 (i.e., a head of the robot 100 adjacent the front legs 120a-b of the robot 100) and one stereo camera as a sensor 132 at a back end of the body 110 of the robot 100 adjacent rear legs 120c-d of the robot 100. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

Referring to FIGS. 1A and 1B, in some implementations, the sensor system 130 includes sensor(s) 132 coupled to a joint J. In some examples, these sensors 132 couple to a motor that operates a joint J of the robot 100 (e.g., sensors 132, 132a-b). Here, these sensors 132 generate joint dynamics 134, $134_{JD}$ in the form of joint-based sensor data 134. Joint dynamics $134_{JD}$ collected as joint-based sensor data 134 may include joint angles (e.g., an upper member $122_U$ relative to a lower member $122_L$), joint speed (e.g., joint angular velocity or joint angular acceleration), and/or joint torques experienced at a joint J (also referred to as joint forces). Here, joint-based sensor data 134 generated by one or more sensors 132 may be raw sensor data, data that is further processed to form different types of joint dynamics $134_{JD}$, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 of the robot 100. With the sensor data 134, a perception system 180 of the robot 100 may generate maps 182 for the terrain about the environment 10.

While the robot 100 maneuvers about the environment 10, the sensor system 130 gathers sensor data 134 relating to the terrain of the environment 10 and/or structure of the robot 100 (e.g., joint dynamics and/or odometry of the robot 100). For instance, FIG. 1A depicts the robot 100 standing on a landing (i.e., level support surface) of a set of stairs 20 as the environment 10 of the robot 100. Here, the sensor system 130 gathering sensor data 134 about the set of stairs 20. As the sensor system 130 gathers sensor data 134, a computing system 140 is configured to store, to process, and/or to communicate the sensor data 134 to various systems of the robot 100 (e.g., the control system 170, the perception system 180, an odometry system 190, and/or a stair modeler 200). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

With continued reference to FIGS. 1A and 1B, in some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 may communicate via a network 150 with a remote system 160 (e.g., a remote computer/server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170 and a perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order to perform controlled actions for the robot 100, such as moving the robot 100 about the environment 10. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

In some examples, the control system 170 includes at least one controller 172, a path generator 174, a step locator 176, and a body planner 178. The control system 170 may be configured to communicate with at least one sensor system 130 and any other system of the robot 100 (e.g., the perception system 180, the odometry system 190, and/or the stair modeler 200). The control system 170 performs operations and other functions using hardware 140. The controller 172 is configured to control movement of the robot 100 to traverse about the environment 10 based on input or feedback from the systems of the robot 100 (e.g., the control system 170, the perception system 180, the odometry system 190, and/or the stair modeler 200). This may include movement between poses and/or behaviors of the robot 100. For example, the controller 172 controls different footstep patterns, leg patterns, body movement patterns, or vision system sensing patterns.

In some examples, the controller 172 includes a plurality of controllers 172 where each of the controllers 172 has a fixed cadence. A fixed cadence refers to a fixed timing for a step or swing phase of a leg 120. For example, the controller 172 instructs the robot 100 to move the legs 120 (e.g., take a step) at a particular frequency (e.g., step every 250 milliseconds, 350 milliseconds, etc.). With a plurality of controllers 172 where each controller 172 has a fixed cadence, the robot 100 can experience variable timing by switching between controllers 172. In some implementations, the robot 100 continuously switches/selects fixed cadence controllers 172 (e.g., re-selects a controller 170 every 3 milliseconds) as the robot 100 traverses the environment 10.

In some implementations, the control system 170 includes specialty controllers 172 that are dedicated to a particular control purpose. For example, the control system 170 may include one or more stair controllers 172 dedicated to planning and coordinating the robot's movement to traverse a set of stairs 20. For instance, a stair controller 172 may ensure the footpath for a swing leg $120_{SW}$ maintains a swing height to clear a riser 24 and/or edge 26 of a stair 20. Other specialty controllers 172 may include the path generator 174, the step locator 176, and/or the body planner 178. Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perceptions system 180 (e.g., map(s) 182). The body planner 178, much like the step locator 176, receives inputs from the perceptions system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

Referring further to FIG. 1B, the odometry system 190 is configured to measure where the robot 100 is located within a world reference frame (e.g., the environment 10) and how fast the robot 100 is moving in that world reference frame. In other words, the odometry system 190 generates odometry information 192 as one or more estimations (e.g., measurements) for a characteristic of the robot 100 relative to a world reference frame. In some examples, the odometry system 190 receives sensor data 134 from a sensor 132 such as an IMU (e.g., accelerometer(s) and/or gyro(s)). With the sensor data 134, the odometry system 190 may generate odometry information 192 based on an assumption that when a distal end 124 of a leg 120 is in contact with the ground surface 12 and not slipping, the distal end 124 is stationary. By combining this assumption with the sensor data 134, the odometry system 190 generates odometry information 192 regarding robot motion relative to the world reference frame (e.g., the environment 10). In other words, the odometry system 190 accounts for kinematics and inertial measurements to produce estimations about the robot 100 with respect to the world reference frame.

In some configurations, the robot 100 is configured to traverse the environment 10 autonomously. For example, the robot 100 has an autonomous mode that, when engaged (e.g., by an operator of the robot 100), allows the system(s) of the robot 100 to operate the robot 100 to move about the environment 10 and/or perform actions within the environment 10 without further input from an external source (e.g., an entity that operates or supervisors the robot 100 by providing inputs to the robot 100). In order to engage the autonomous mode, the robot 100 first surveys the environment 10 to generate one or more maps 182 using the perception system 180. In other words, prior to the autonomous mode, the robot 100 undertakes a mapping process to collect sensor data 134 of the environment 10 that will be autonomously or semi-autonomously traversed. In some examples, an operator manually drives the robot 100 (i.e., moves the robot 100 by user input) through the environment 10 (e.g., using a remote controller 172). By the robot 100 first gathering its surroundings in the environment 10, the mapping process provides environmental context to systems of the robot 100 to enable the systems to autonomously operate the robot 100.

Generally speaking, the mapping process calibrates the robot 100 to features in the environment 10; allowing the robot 100 to have the ability to autonomously or semi-autonomously operate subsequent to the mapping process. Here, semi-autonomously refers to the ability of the robot 100 to perform certain tasks (e.g., specialized tasks) independent of external inputs. For example, the robot 100 has a stair mode where the robot 100 is able to traverse stairs without external inputs or a palletizing mode where the robot 100 packs or unpacks boxes in an independent manner. In some configurations, an operator of the robot 100 identifies (e.g., turns on a mode of the robot 100) that he or she wishes to operate the robot 100 autonomously or semi-autonomously (e.g., for specialized autonomous activities). Once the robot 100 receives such an identification, systems associated with the robot 100 may prompt the operator to perform the initial mapping process if it has not been previously performed by the robot 100.

During the initial mapping process, there are particular features in the environment 10 that the robot 100 is trying to recognize. One of these features is stairs 20. Particularly, stairs 20 are a feature that may affect the robot's navigation of an environment 10. For instance, stairs 20 may pose a sudden hazard to the robot 100 when the robot 100 encounters stairs 20. If the robot 100 approaches the stairs 20 from above and did not know ahead of time that the stairs 20 existed, the robot 100 may not have much time to decide whether the sudden perceived drop-off in elevation is actually safe for the robot 100 to navigate. For example, the robot 100 while navigating a hallway suddenly approaches the end of the hallway and first perceives that stairs 20 ascend/descend from a doorway perpendicular to the end of the hallway. With sensors 132 unable to see through walls, the walls of the hallway would make the stairs 20 directly off the hallway seem invisible to the robot 100 until the robot 100 was located in front of the stairs 20. Depending to the gait of the robot 100 and/or speed of approach, sudden decision making by the robot 100 to navigate the stairs 20 may be problematic and/or dangerous for the robot 100 and/or its surroundings.

If instead, a robot 100 knew that it was approaching stairs 20, the robot 100 may prepare to navigate the stairs 20; increasing the robot's ability to navigate the stairs 20 successfully. In other words, the robot 100 may position its body 110, legs 120, or structure to improve navigation of the stairs 20. For instance, when the robot 100 approaches stairs 20, it may change the angles or heights of its sensors 132 to increase its capabilities to perceive the stairs 20 (e.g., avoid potential occlusions). The robot 100, with its sensors 132, may peer upwards, downwards, and/or change its body height to optimize its perception of the stair structure. In some examples, the robot 100 is configured to navigate the stairs 20 at a particular orientation or pose P (e.g., alignment) such that the robot 100 minimizes structural collisions with the stairs 20 themselves. As an example, the robot 100 descends stairs backwards (e.g., head up and rear legs 120 first) to prevent articulation of its locomotion structures 120 from colliding with the risers 24 of the stairs 20. Here, to descend the stairs 20 backwards, the robot 100 may need to turn around. In some implementations, the robot 100 may be configured to center itself with respect to the stairs 20 in order to provide the robot 100 with the greatest lateral space as the robot 100 ascends/descends stairs 20. Each of these particular alignments, used to improve the ability of the robot 100 to navigate the stairs 20, may be planned in advance when the initial mapping process identifies stairs 20 in the environment 10.

In some configurations, the robot 100 is able to automatically engage a stair mode for the robot 100. For example, when the robot 100 knows at least a rough location of stairs 20 within the environment 10, the robot 100 activates the stair mode when the robot 100 is adjacent to or within a threshold distance of the stairs 20. In some implementations, the robot 100 is configured to prevent or to warn a user or operator from engaging the stair mode when, based on the initial mapping process, the robot 100 is aware that the robot 100 is not within a particular range of stairs 20. By selectively activating the stair mode only when stairs 20 are imminent (e.g., within the threshold distance/range), the robot 100 may conserve processing resources (e.g., CPU usage) and/or intelligently use computing resources. For example, the robot 100 is aware that the robot 100 does not need to detect stairs 20 and optimizes its detection for other features in the environment 10.

Figure 1C:
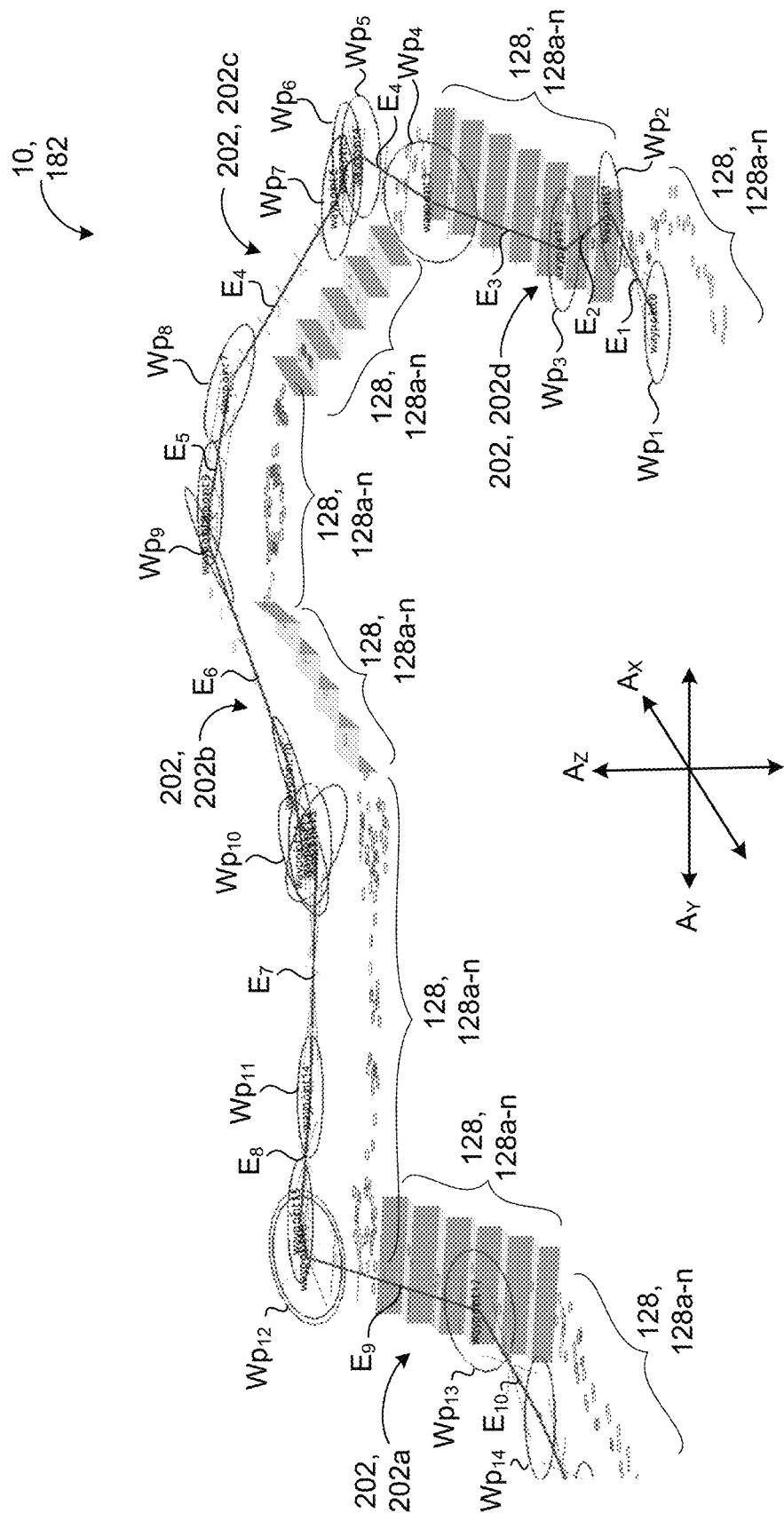
FIG. 1C is a perspective view of an example environment traversed by the robot of FIG. 1A.

With reference to FIGS. 1A-1C, as the robot 100 undergoes the initial mapping process, the robot 100 establishes waypoints Wp, $Wp_{1-i}$ in the environment 10. These waypoints may incorporate odometry information from the odemetry system 190 along with information about the robot 100 such as pose P and other kinematics of the robot 100. When the robot 100 traverses the environment 10 during the initial mapping process, the robot 100 establishes waypoints Wp periodically (e.g., every couple meters or when the robot 100 changes direction). An edge E connects each waypoint Wp to its neighboring waypoints Wp along the traversal path taken by the robot 100. Each edge E may serve as storage for information about the robot 100 that occurred while the robot 100 travels along the edge E between two waypoints Wp. For instance, the edge E stores footfalls 128 that occurred by the robot 100 when the robot 100 moved between the waypoints Wp along the edge E.

A footfall 128, much like a footprint, refers to a spatial location where a distal end 124 of a locomotion structure 120 of the robot 100 contacted the support surface 12. A footfall 128 may also be referred to interchangeably as a footfall location. In some examples, the footfall 128 corresponds to a touchdown for a foot 124 of a leg 120 of the robot 100. Since a footfall 128 includes a spatial location in the environment 10 where a touchdown occurred, the footfall 128 includes coordinate/odometry information to identify the location in the environment 10. The location information corresponding to a footfall 128 may be relative location information (e.g., relative to a position of a waypoint Wp or other feature in the environment 10) or global location information. For example, the footfall 128 has a three dimensional coordinate position relative to the global world reference frame (e.g., corresponds to an x, y, z location).

As footfalls 128 occur while the robot 100 traverses the environment 10 during the initial mapping process, systems (e.g., the sensor system 130, perception system 180, and/or odometry system 190) of the robot 100 are able to determine that a footfall 128 occurs and to store the footfall 128 (e.g., locational/contact information about the footfall 128 and/or the robot 100 at the time of the footfall 128). In some examples, each time a foot 124 of the robot 100 contacts a support surface 12, one or more sensors 132 of the robot 100 detect the contact as a footfall 128. In some implementations, systems (e.g., the perception system 180 and/or odometry system 190) of the robot 100 record footfalls 128 by querying sensor data 134 from contact detection sensors 132 (e.g., sensors 132 that measure forces experienced at the legs/feet 120, 124 of the robot 100) to determine whether a particular foot 124 of the robot 100 is in contact with a support surface 12 at the time of the query. When a sensor 132 indicates that a particular foot 124 is indeed in contact with a support surface 12, the systems of the robot 100 determine the location of the contact (e.g., in the world reference frame) and store this information along with the footfall 128. For example, the perception system 180 stores footfalls 128 in data structures associated with edges E for a map 182 generated during the initial mapping process.

FIG. 1C illustrates an initial map 182 of the environment 10 generated by the perception system 180 during execution of the initial mapping process. Here, the robot 100 was driven in a loop that ascended two sets of stairs 20 and descended two sets of stairs 20. As the robot 100 moved through loop within the environment 10 during the initial mapping process, systems of the robot 100 determine footfalls 128 that occur. In this example, the sets of footfalls 128, 128a-n are associated (e.g., stored in data structures) with edges E, $E_{1-n}$ (e.g., shown as ten edges $E_{1-10}$) between the waypoints Wp, $Wp_{1-14}$, but the footfalls 128 may be stored in any data location accessible to systems of the robot 100. Based on these footfalls 128, a stair detector 200 is configured to determine whether a set of stairs 20 exists based on the footfalls 128. Here, the stair detector 200 identifies four stair models 202, 202a-d along the path traveled by the robot 100. In other words, a stair detector 200 functions at or in conjunction with the initial mapping process to receive footfalls 128 as inputs and generate one or more stair models 202 as outputs. Additionally or alternatively, the stair detector 200 may be configured to first determine footfalls 128 from sensor data 134 and then generate one or more stair models 202 when the footfalls 128 indicate a strong likelihood that stairs 20 exist within the environment 10. The stair detector 200 may be part of other systems of the robot 100 (e.g., the perception system 180) or its own dedicated system of the robot 100 (e.g., includes its own dedicated processing resources).

Figure 2A:
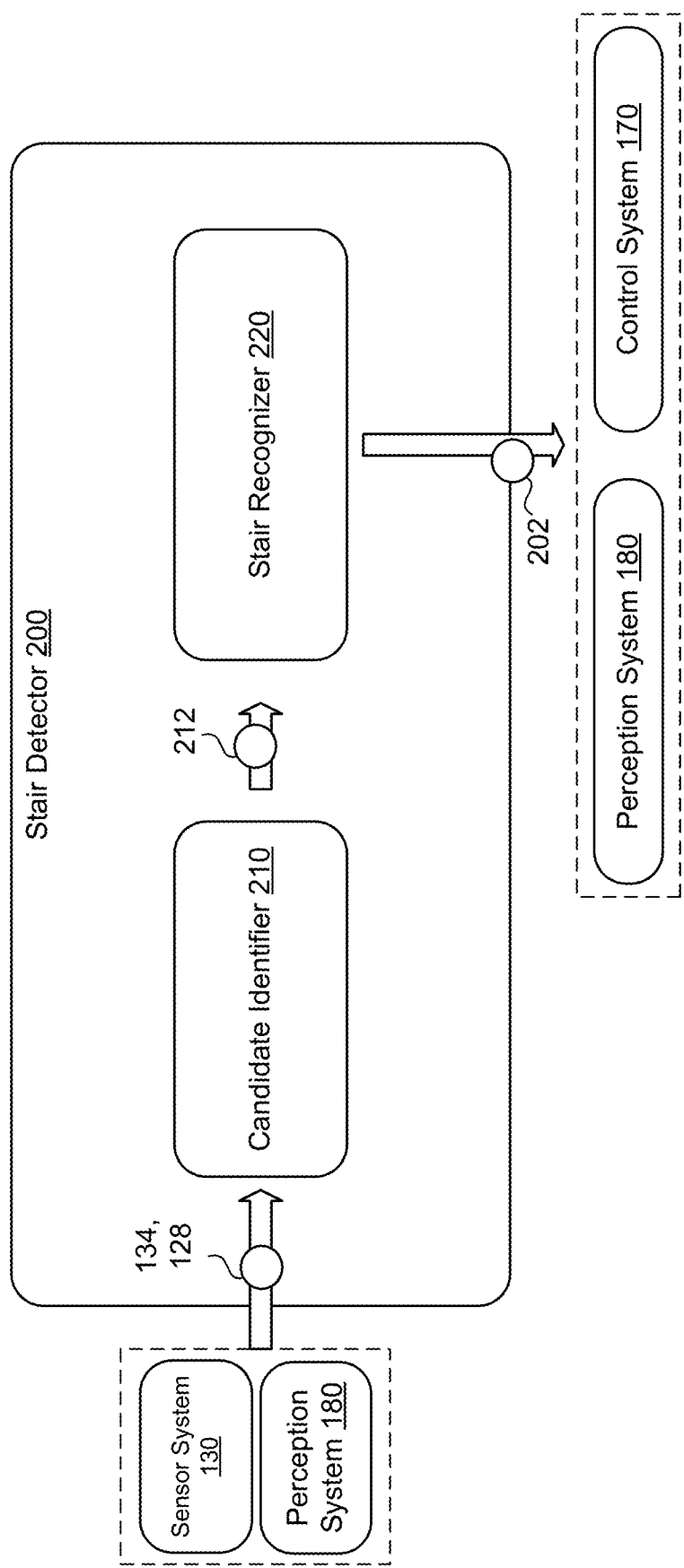
FIGS. 2A-2C are schematic views of example stair detectors of the robot of FIG. 1A.
Figure 2B:
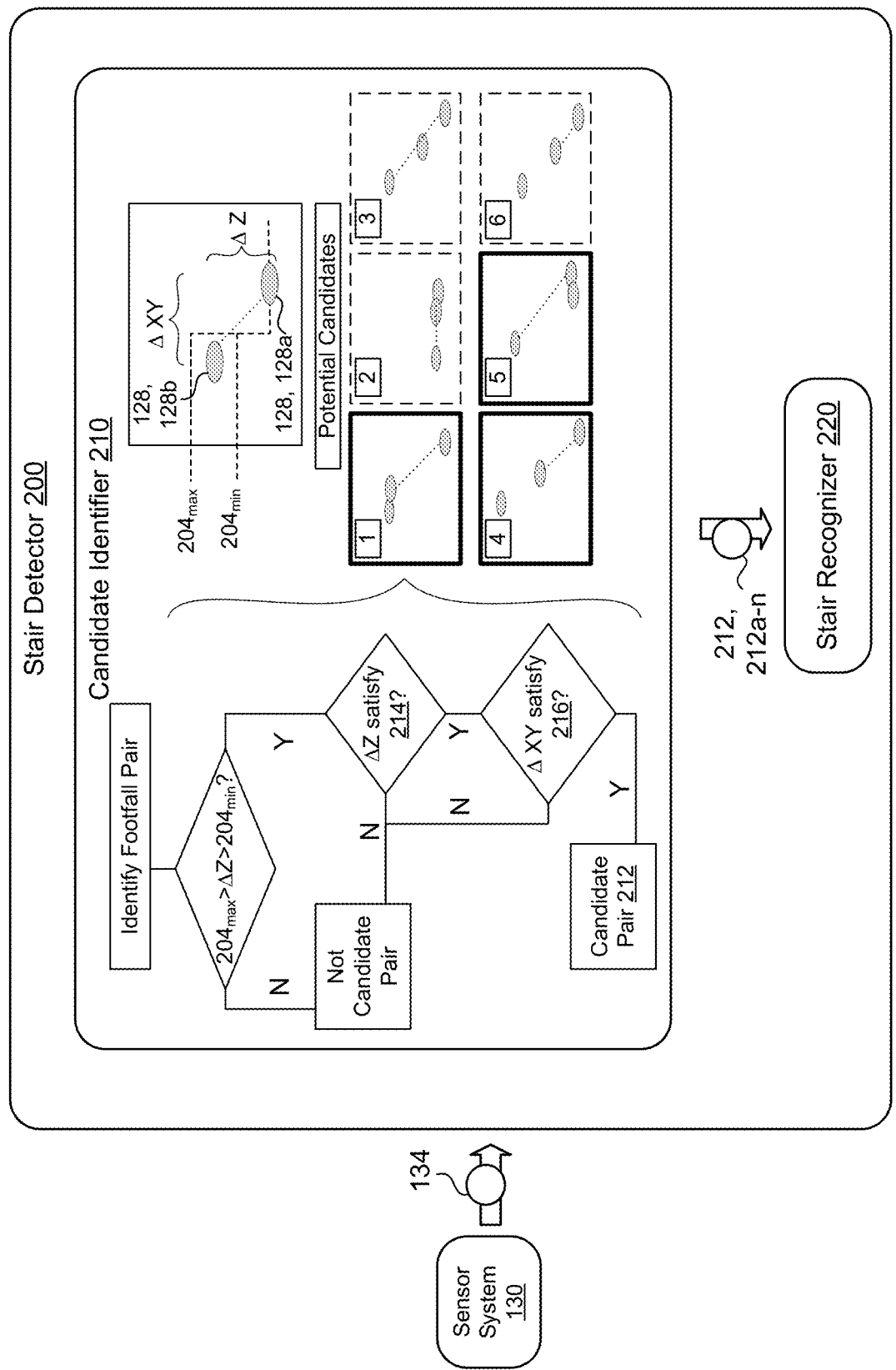
Figure 2C:
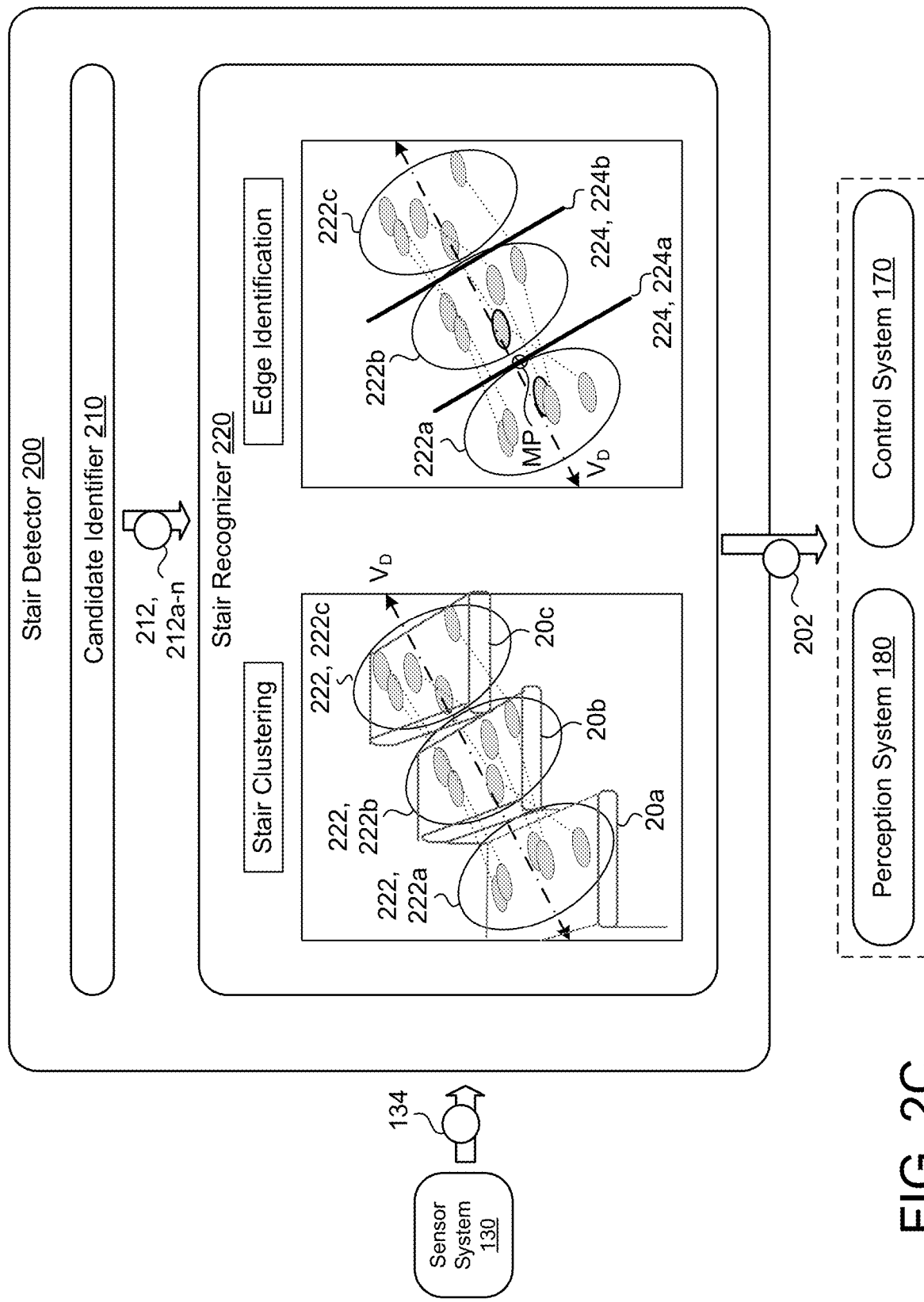

Referring to FIGS. 2A-2C, the stair detector 200 includes a candidate identifier 210 and a stair recognizer 220. The candidate identifier 210 is configured to determine a pair of footfalls 128 defined as a candidate pair 212 of footfalls 128. A candidate pair 212 refers to two footfalls 128 nearby in position that have a spatial relationship indicative of a structure of a stair 20. In other words, the identifier 210 is configured to identify two footfalls 128 whose vertical and horizontal spacing appears to correspond to a foot 124 of the robot 100 moving from a first stair 20a to a second stair 20b to clear a riser 24. Because in reality the robot 100 moves its feet 124 from a tread 22a of first stair 20a to a tread 22b of a second stair 20b (either above or below the first stair 20a) over a riser 24, this movement pattern will be reflected in the pattern of footfalls 128. Therefore, the identifier 210 is configured with parameters set to correspond to threshold distances (e.g., a thresholds for a vertical distance and a horizontal distance) that are typical of a stair structure and/or movement patterns for the legs 120 of the robot 100.

In some implementations, the parameters include a stair height threshold 214 and a stair depth threshold 216. When identifying a candidate pair 212 of footfalls 128, the identifier 210 determines whether the footfalls 128 satisfy each threshold 214, 216 before classifying the footfalls 128 as a candidate pair 212. For instance, The identifier 210 may determine whether the footfalls 128 satisfy these thresholds 214, 216 in either order (e.g., first the stair height threshold 214 and then the stair depth threshold 216 or vice versa). In order to determine whether the two footfalls 128 satisfy these thresholds 214, 216, the identifier 210 determines a locational position of each footfall 128 (e.g., x, y, z coordinate position) and determines a distance between each footfall 128 (e.g., with respect to each coordinate—$\Delta x$, $\Delta y$, $\Delta z$). Here, a height (e.g., vertical distance) generally refers to a measurement (e.g., $\Delta z$) in the z-direction along an axis parallel to a gravitational axis of the robot 100 while the depth (e.g., horizontal distance) refers to a measurement in the XY plane (e.g., $\Delta x$ or $\Delta y$) that occurs perpendicular to the gravitation axis of the robot 100. With the distance between each footfall 128 of a potential candidate pair, the identifier 210 compares these distances to the appropriate thresholds 214, 216. For instance, the identifier 210 compares the height distance measurement between the footfalls 128 to the stair height threshold 214 and a depth distance measurement between the footfalls 128 to the stair depth threshold 216.

In some configurations, the stair height threshold 214 corresponds to a height range between a particular stair height minimum $204_{min}$ and a stair height maximum $204_{max}$. In other words, based on the gait of robot 100 and/or the structural configuration of the robot 100, there is a particular height for the robot 100 where, above this height, the robot 100 needs to change its natural gait/swing trajectory to ensure clearance of the this height change for the foot 124 of the robot 100 while, below this height, the robot 100 does not need to alter its natural gait/swing trajectory. Due to this inherent swing trajectory, the stair detector 200 may be configured to ignore modeling a stair 20 when the height change is lower than the height minimum $204_{min}$. That is, although shallow stairs 20 with riser heights less than the height minimum $204_{min}$ exist, these stairs 20 do not pose much of a navigability risk to the robot 100 and/or need special gait instructions.

Similarly, due to range of motion limitations and/or gait limitations, there is a particular height above which the robot 100 cannot step without a more powerful movement (e.g., a jump). In other words, the robot 100 has a maximum swing height that ensures its feet 124 clear an object below this height. As such, a height greater than this height (i.e., the stair height maximum $204_{max}$), even if the height of a stair riser 24 (e.g., a large amphitheater stair), is an outlier height that stair detector 200 may be configured to ignore when modeling a stair 20. With the stair height minimum $204_{min}$ and the stair height maximum $204_{max}$, the identifier 210 may configure the stair height threshold 214 as a range of height values between the stair height minimum $204_{min}$ and the stair height maximum $204_{max}$. In other words, if the height measurement between two footfalls 128 is a between the stair height minimum $204_{min}$ and the stair height maximum $204_{max}$, the height measurement satisfies the stair height threshold 214. In contrast, when the height measurement is greater than the stair height maximum $204_{max}$ or less than the stair height minimum $204_{min}$, the height measurement fails to satisfy the stair height threshold 214.

Referring to FIG. 2B, when the identifier 210 evaluates a potential candidate pair of footfalls 128, the identifier 210, in a general sense, determines whether footfalls 128 (e.g., shown as a first footfall 128, 128a and a second footfall 128, 128b) near each other in location satisfy the thresholds 214, 216 while also determining whether another footfall 128 does not invalidate the pair of footfalls 128, 128a-b as a candidate pair 212. For example, although two footfalls 128 may be near each other, a third footfall 128 may occur between the two footfalls 128. For instance, FIG. 2B illustrates, in the upper right-hand corner, the identifier 210 evaluating a potential candidate pair 128a-b with a dotted line segment between two footfalls 128 (e.g., shown as grey shaded ovals). Here, no intervening footfall 128 exists between these two footfalls 128*a-b*. Yet in the other depicted examples (e.g., labeled 1-6), such as a third example, an intervening footfall 128 exists between the two footfalls 128 being evaluated by the identifier 210; invalidating the pair of footfalls 128 as a candidate pair 212. In some examples, the identifier 210 tries to best alleviate the issue of an intervening invalidating footfalls 128 between a potential candidate pair by performing the candidate pair determination on footfalls 128 that are most adjacent to each other (e.g., based on coordinate position). In FIG. 2B, the examples outlined with a darker box refer to footfalls 128 that the identifier 210 has determined to be candidate pairs 212, while the examples with a dotted box outline potential candidate pairs that the identifier 210 determined to not be a candidate pair 212. Here, the second example fails to satisfy the stair height threshold 214. The third example has an intervening footfall 128. The sixth example is an evaluation of the third example with respect to adjacent footfalls 128, but the potential candidate pair does not satisfy either threshold 214, 216 (and is below the stair height minimum $204_{min}$).

The stair detector 200 also includes a stair recognizer 220. The stair recognizer 220, is configured to, based on candidate pairs 212 of footfalls 128, determine stairs 20 corresponding to the footfalls 128 of the candidate pairs 212. Stated differently, the identifier 210 of the detector 200 is tasked with identifying footfalls 128 that occur on treads 22 of a stair 20 based positional data while the recognizer 220 is then configured to model each stair 20 for a stair model 202 based on clusters of footfalls 128 corresponding to candidate pairs 212. With this approach, the identifier 210 serves as a form of a filter that filters out footfalls 128 that likely do not exist on stairs 20 and the recognizer 220 constructs the model 202 based on the remaining filtered footfall data.

Referring to FIG. 2C, the stair recognizer 220 is configured to identify that each footfall 128 of a candidate pair 212 corresponds to an adjacent stair 20 on a set of stairs 20. In other words, a first footfall 128 of a candidate pair 212 occurs on a first stair 20*a* while a second footfall 128 of the candidate pair 212 occurs on a second stair 20*b* (e.g., above or below the first stair 20*a*). With this information, the recognizer 220 is configured to cluster footfalls 128 of the candidate pairs 212 communicated from the identifier 210. In some examples, the recognizer 220 clusters the footfalls 128 based on a height (e.g., z-coordinate) corresponding to each footfall 128. For example, the recognizer 220 clusters each footfall 128 of the candidate pairs 212 that is within a particular height tolerance of each other. In some examples, the recognizer 220 determines average height intervals corresponding to all footfalls 128 of candidate pairs 212. For instance, in a three stair 20*a-c* example, the recognizer 220 identifies three bands of heights (e.g., three discrete height range intervals) within all the footfalls 128 of the candidate pairs 212; a first band that corresponds to a first stair 20*a*, a second band that corresponds to a second stair 20*b*, and a third band that corresponds to a third stair 20*c*. From this identification, the recognizer 220 defines each band as a cluster group 222 corresponding to a stair 20 for the model 202. Here, the recognizer 220 generates a stair 20 for the model 202 for each cluster group 222. When recognizer 220 generates a stair 20 for the model 202 from each cluster group 222, the recognizer 220 may define the stair 20 in the model 202 to exist at a z-coordinate height corresponding to the average height for all footfalls 128 within a given cluster group 222. By defining a stair 20 of the model 202 at the average height for the cluster group 222, the recognizer 220 helps ensure that some flexion in the stair structure from a foot contact during footfall generation does not lead to inaccuracies for the actual z-height of a top surface of a tread 22 of a stair 20.

Once the footfalls 128 from the candidate pairs 212 are defined by cluster groups 222, the recognizer 220 has established where it believes top surfaces for treads 22 of the stairs 20 to be, but the stair model 202 still lacks some form of horizontal delineation between each stair 20 in the model 202. In some examples, the recognizer 220 defines an edge 26 of each stair 20 to be where one cluster group 222 changes to its neighboring cluster group 222. For instance, FIG. 2C depicts a first line 224, 224*a* as a stair edge 26 for the model 202 between the first cluster group 222, 222*a* and a second cluster group 222*b*. In some implementations, the recognizer 220 defines the position of the line 224 by a midpoint between cluster groups 222. Here, the recognizer 220 identifies a footfall 128 in a cluster group 222 that is most adjacent to a footfall 128 in a second, neighboring cluster group 222. For instance, FIG. 2C illustrates the two most adjacent footfalls 128 in a darker outline than the rest in the first cluster group 222*a* and the second cluster group 222*b*. Although these two footfalls 128 may correspond to different candidate pairs 212, the footfall 128 in the first cluster group 222*a* is the closest (e.g., in XY position) to the footfall 128 in the second cluster group 222*b*. As such, the recognizer 220 defines the line based on the midpoint (e.g., shown as midpoint MP) between these two footfalls 128. For example, the first line 224*a* corresponding to an edge 26 of the second stair 20*b* in the model 202 passes through the midpoint MP.

In some configurations, the model 202 designates an orientation for the stairs 20 of the model 202. In other words, the model 202 defines a vector direction $V_D$ for the stairs 20 of the model 202. Here, the vector direction $V_D$ refers to a vector that defines the direction and/or slope of the stairs 20 in three-dimensional space. When the robot 100 uses the model 202 navigating the environment 10, the robot 100 may orient itself or its sensors 132 with the vector direction $V_D$ to aid the robot 100 in perceiving the stairs 20 or aligning with the stairs 20. In some examples, the robot 100 navigates the stairs 20 better when the body 110 of the robot 100 is aligned with the vector direction $V_D$ than not. This alignment may afford the robot 100 the greatest lateral deviation while traversing the stairs 20 (e.g., by traversing the center of the stairs 20) and potentially prevent the robot 100 from colliding with the stair structure itself. In some configurations, in order to determine the vector direction $V_D$, the recognizer 220 determines the center of each cluster group 222 (e.g., the centroids of the collection of footfalls 128 included in a cluster group 222). Here, the recognizer 220 define the vector direction $V_D$ as a vector extending from a cluster group 222 at a first end of a stair model 202 to a cluster group 222 at a second end of the stair model 202. FIG. 2C, therefore, depicts the vector direction $V_D$ extending through center points of the first, second, and third cluster groups 222*a-c*.

Figure 3:
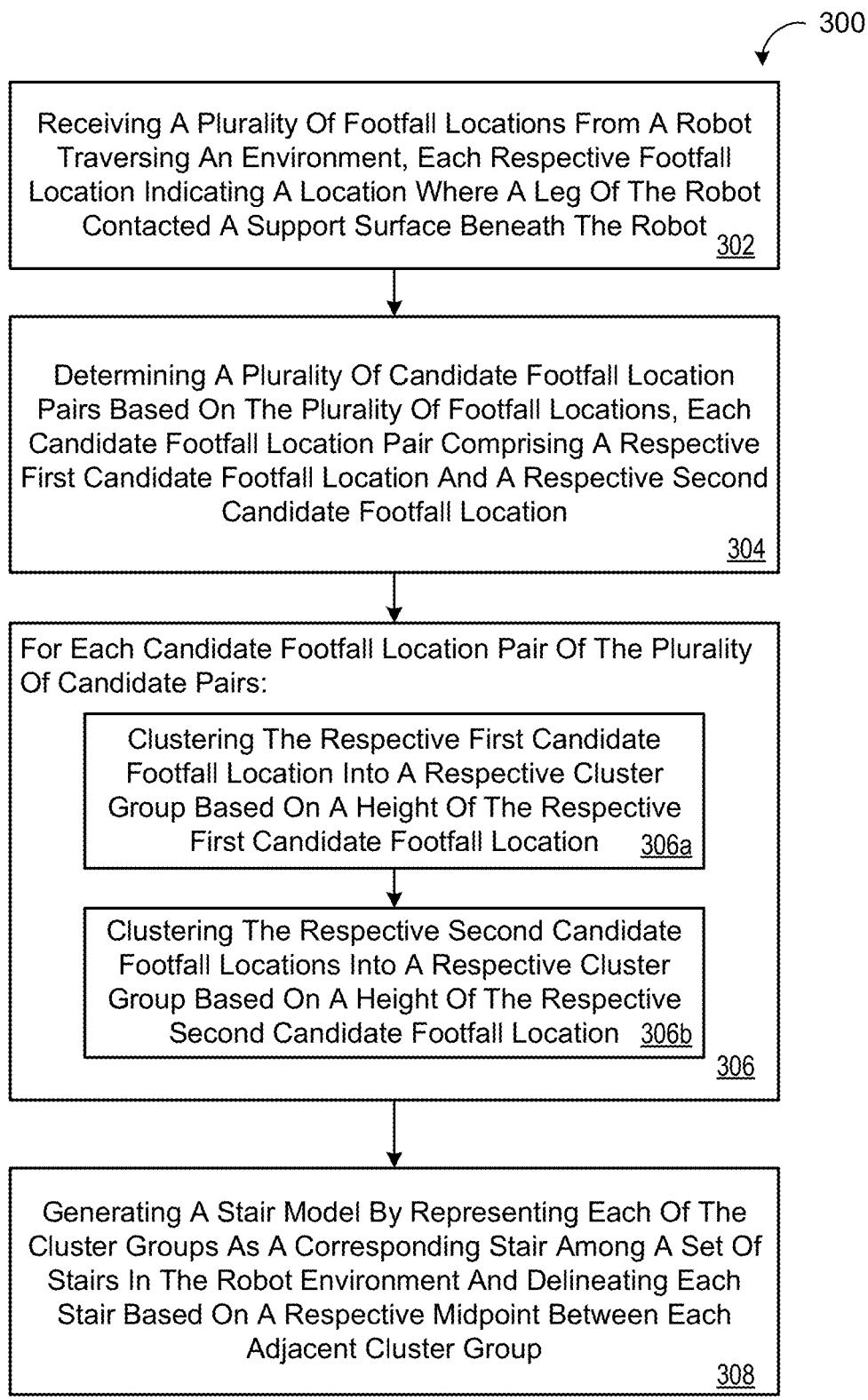
FIG. 3 is a flow chart of an example arrangement of operations for a method of identifying stairs from footfalls.

FIG. 3 is a flowchart of an example arrangement of operations for a method of identifying stairs 20 from footfalls 128. At operations 302, the method 300 receives a plurality of footfall locations 128 indicating a location where a leg 120 of the robot 100 contacted a support surface 12 beneath the robot 100. At operation 304, the method 300 determines a plurality of candidate footfalls location pairs 212 based on the plurality of footfall locations 128. Here, each candidate footfall location pair 212 includes a respective first candidate footfall location 212, 212*a* and a second respective candidate footfalls location 212, 212*b*. Operation 306 includes a first operation 306a and a second operation 306b for each candidate footfall location pair 212 of the plurality of candidate pairs 212. At operations 306a, the method 300 clusters the respective first candidate footfall location 128, 128a into a first respective cluster group 222, 222a based on a height of the respective first candidate footfall location 128, 128a. At operation 306b, the method 300 clusters the respective second candidate footfall location 128, 128b into a second respective cluster group 222, 222b based on a height of the respective second candidate footfall location 128, 128b. At operation 308, the method 300 generates a stair model 202 by representing each of the cluster groups 222 as a corresponding stair 20 among a set of stairs 20, 20a-n in the robot environment 10 and delineating each stair 20 based on a respective midpoint MP between each adjacent cluster group 222.

Figure 4:
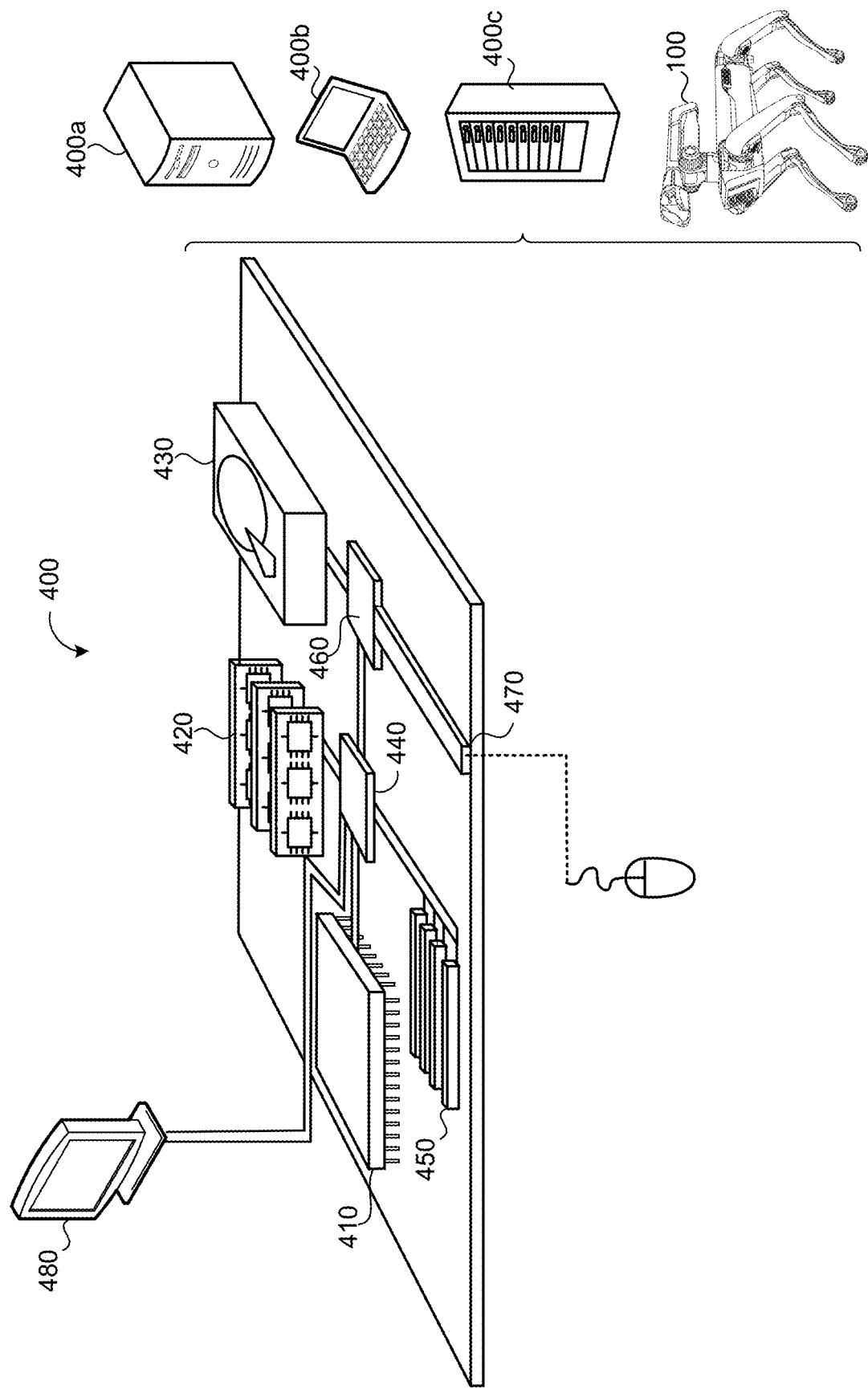
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 400c, or as part of the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a robot, sensor data representing a plurality of footfall locations of the robot, each footfall location of the plurality of footfall locations indicating a location where a distal end of a leg of the robot contacted a support surface beneath the robot;
selecting, by the data processing hardware, a footfall location pair of the plurality of footfall locations, the footfall location pair comprising a first footfall location and a second footfall location, wherein selecting the footfall location pair is based on determining that at least one of a vertical distance between the first footfall location and the second footfall location satisfies a first threshold associated with one or more heights of one or more stair structures, or a horizontal distance between the first footfall location and the second footfall location satisfies a second threshold associated with one or more depths of one or more stair structures;
clustering, by the data processing hardware, each footfall location of the footfall location pair into a respective cluster group of footfall locations of a plurality of cluster groups of footfall locations based on a height of the respective footfall location and based on selecting the footfall location pair;
generating, by the data processing hardware, a stair model of a set of stairs based on the received sensor data by representing each of the plurality of cluster groups of footfall locations as a corresponding stair of the set of stairs; and
instructing, by the data processing hardware, traversal of the set of stairs by at least one robot.

2. The method of claim 1, wherein:
the first threshold corresponds to a height of a stair riser; and
first footfall location and the second footfall location satisfies a stair depth threshold, the
the second threshold corresponds to a depth of a stair.

3. The method of claim 1, wherein the plurality of cluster groups of footfall locations indicates an orientation associated with the stair model of the set of stairs, the orientation corresponding to a vector direction that the set of stairs ascends or descends within an environment.

4. The method of claim 1, further comprising:
identifying, by the data processing hardware, from the plurality of cluster groups of footfall locations, a first cluster group of footfall locations and a second cluster group of footfall locations adjacent to the first cluster group of footfall locations, each of the first cluster group of footfall locations and the second cluster group of footfall locations comprising one or more footfall locations;
selecting, by the data processing hardware, a third footfall location from the one or more footfall locations of the first cluster group of footfall locations and a fourth footfall location from the one or more footfall locations of the second cluster group of footfall locations, wherein the third footfall location and the fourth footfall location are separated by a particular horizontal distance; and
generating, by the data processing hardware, a stair edge for the stair model of the set of stairs based on a horizontal midpoint between the third footfall location and the fourth footfall location.

5. The method of claim 4, wherein:
the plurality of cluster groups of footfall locations indicates an orientation associated with the stair model of the set of stairs, the orientation corresponding to a vector direction that the set of stairs ascends or descends within an environment, and the stair edge extends in a direction perpendicular to the vector direction.

6. The method of claim 1, wherein instructing traversal of the set of stairs by the at least one robot comprises communicating the stair model of the set of stairs to a control system of the robot to navigate the set of stairs in an autonomous drive mode, wherein the at least one robot comprises the robot.

7. The method of claim 1, further comprising:
detecting, by the data processing hardware, that the robot is approaching a location associated with the stair model of the set of stairs; and instructing, by the data processing hardware, movement by the robot to an orientation associated with the stair model of the set of stairs, the orientation corresponding to a vector direction that the set of stairs ascends or descends within an environment.

8. The method of claim 7, wherein instructing movement by the robot to the orientation comprises instructing movement by the robot such that one or more sensors of the robot face the vector direction.

9. The method of claim 1, wherein the set of stairs comprise a set of stairs within an environment, the method further comprising augmenting, by the data processing hardware, a perception map of the environment with the stair model of the set of stairs.

10. The method of claim 1, wherein the robot is a quadruped robot.

11. The method of claim 1, wherein instructing traversal of the set of stairs by the at least one robot comprises instructing traversal of the set of stairs by the at least one robot according to the stair model of the set of stairs.

12. The method of claim 1, wherein instructing traversal of the set of stairs by the at least one robot comprises providing the stair model of the set of stairs to a control system.

13. The method of claim 1, wherein instructing traversal of the set of stairs by the at least one robot comprises providing the stair model of the set of stairs to a control system wherein the control system comprises a control system of the robot, wherein the at least one robot comprises the robot.

14. The method of claim 1, wherein instructing traversal of the set of stairs by the at least one robot comprises providing the stair model of the set of stairs to a control system, wherein the control system comprises a control system of a remote system.

15. A robot comprising:
a body;
two or more legs coupled to the body and configured to traverse an environment; and
a stair modeling system in communication with the robot, the stair modeling system comprising data processing hardware and memory hardware in communication with the data processing hardware, the memory hardware storing instructions that when executed on the data processing hardware cause the data processing hardware to perform operations comprising:
receiving sensor data representing a plurality of footfall locations of at least one leg of the two or more legs, each footfall location of the plurality of footfall locations indicating a location where a distal end of a corresponding leg of the two or more legs contacted a support surface beneath the robot;
selecting a footfall location pair of the plurality of footfall locations, the footfall location pair comprising a first footfall location and a second footfall location, wherein selecting the footfall location pair is based on determining that at least one of a vertical distance between the first footfall location and the second footfall location satisfies a first threshold associated with one or more heights of one or more stair structures, or a horizontal distance between the first footfall location and the second footfall location satisfies a second threshold associated with one or more depths of one or more stair structures;
clustering each footfall location of the footfall location pair into a respective cluster group of footfall locations of a plurality of cluster groups of footfall locations based on a height of the respective footfall location and based on selecting the footfall location pair;
generating a stair model of a set of stairs based on the received sensor data by representing each of the plurality of cluster groups of footfall locations as a corresponding stair of the set of stairs; and
instructing traversal of the set of stairs by at least one robot.

16. The robot of claim 15, wherein:
the first threshold corresponds to a height of a stair riser; and
the second threshold corresponds to a depth of a stair tread.

17. The robot of claim 15, wherein the plurality of cluster groups of footfall locations indicates an orientation associated with the stair model of the set of stairs, the orientation corresponding to a vector direction that the set of stairs ascends or descends within an environment.

18. The robot of claim 15, wherein the operations further comprise:
identifying from the plurality of cluster groups of footfall locations, a first cluster group of footfall locations and a second cluster group of footfall locations adjacent to the first cluster group of footfall locations, each of the first cluster group of footfall locations and the second cluster group of footfall locations comprising one or more footfall locations;
selecting a third footfall location from the one or more footfall locations of the first cluster group of footfall locations and a fourth footfall location from the one or more footfall locations of the second cluster group of footfall locations, wherein the third footfall location and the fourth footfall location are separated by a particular horizontal distance; and
generating a stair edge for the stair model of the set of stairs based on a horizontal midpoint between the third footfall location and the fourth footfall location.

19. The robot of claim 18, wherein:
the plurality of cluster groups of footfall locations indicates an orientation associated with the stair model of the set of stairs, the orientation corresponding to a vector direction that the set of stairs ascends or descends within the environment, and
the stair edge extends in a direction perpendicular to the vector direction.

20. The robot of claim 15, wherein instructing traversal of the set of stairs by the at least one robot comprises communicating the stair model of the set of stairs to a control system of the robot to navigate the set of stairs in an autonomous drive mode, wherein the at least one robot comprises the robot.

21. The robot of claim 15, wherein the operations further comprise:
detecting that the robot is approaching a location associated with the stair model of the set of stairs; and
instructing movement by the robot to an orientation associated with the stair model of the set of stairs, the orientation corresponding to a vector direction that the set of stairs ascends or descends within the environment.

22. The robot of claim 21, wherein instructing movement by the robot to the orientation comprises instructing movement by the robot such that one or more sensors of the robot face the vector direction.

23. The robot of claim 15, wherein the operations further comprise augmenting a perception map of the environment with the stair model of the set of stairs.

24. The robot of claim 15, wherein the two or more legs comprise four legs defining a quadruped robot.

* * * * *